(12) United States Patent
Masumoto et al.

(10) Patent No.: US 6,861,821 B2
(45) Date of Patent: Mar. 1, 2005

(54) BATTERY WITH RESIN INTEGRATED RESIN SUBSTRATE

(75) Inventors: Kenjin Masumoto, Nishinomiya (JP); Katsumi Kozu, Sanda (JP); Kunio Tsuruta, Ikoma (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/343,299

(22) PCT Filed: Jun. 27, 2002

(86) PCT No.: PCT/JP02/06523
§ 371 (c)(1),
(2), (4) Date: Feb. 19, 2003

(87) PCT Pub. No.: WO03/003485
PCT Pub. Date: Jan. 9, 2003

(65) Prior Publication Data
US 2003/0180582 A1 Sep. 25, 2003

(30) Foreign Application Priority Data
Jun. 28, 2001 (JP) .......................................... 2001-196234
Jun. 26, 2002 (JP) .......................................... 2002-185398

(51) Int. Cl.[7] .............................................. H01M 10/46
(52) U.S. Cl. ....................................................... 320/107
(58) Field of Search ................................ 320/107, 110, 320/116; 429/99, 100

(56) References Cited

U.S. PATENT DOCUMENTS

| 5,106,708 A | * | 4/1992 | Bish et al. .................. 429/160 |
| 5,508,131 A | * | 4/1996 | Bowen et al. ............... 429/210 |
| 5,968,682 A | * | 10/1999 | Moriyama et al. .......... 429/176 |
| 2002/0173709 A1 | * | 11/2002 | Fine et al. ................... 600/335 |
| 2003/0173709 A1 | * | 9/2003 | Iwaizono et al. ...... 264/272.17 |

FOREIGN PATENT DOCUMENTS

| JP | 2000-021372 | 1/2000 |
| JP | 2000-315483 | 11/2000 |
| JP | 2002-134077 | 5/2002 |
| JP | 2002-166447 | 6/2002 |

* cited by examiner

*Primary Examiner*—Edward H. Tso
(74) *Attorney, Agent, or Firm*—Jordan and Hamburg LLP

(57) ABSTRACT

A battery and a battery pack comprising a rechargeable battery (2) and a circuit substrate (3) integrated therein by a resin mold package (11) are provided. Resin is filled between the rechargeable battery (2) and the substrate (3) electrically connected thereto, so as to unite them as one battery or battery pack. The rechargeable battery (2) includes an engaging member (26) which functions as an anchor to the resin mold package (11) formed onto the battery, whereby the resin mold package (11) is firmly joined to the rechargeable battery (2). A thermo-sensitive element can be incorporated either on the circuit substrate (3) or within the space filled with resin.

17 Claims, 19 Drawing Sheets

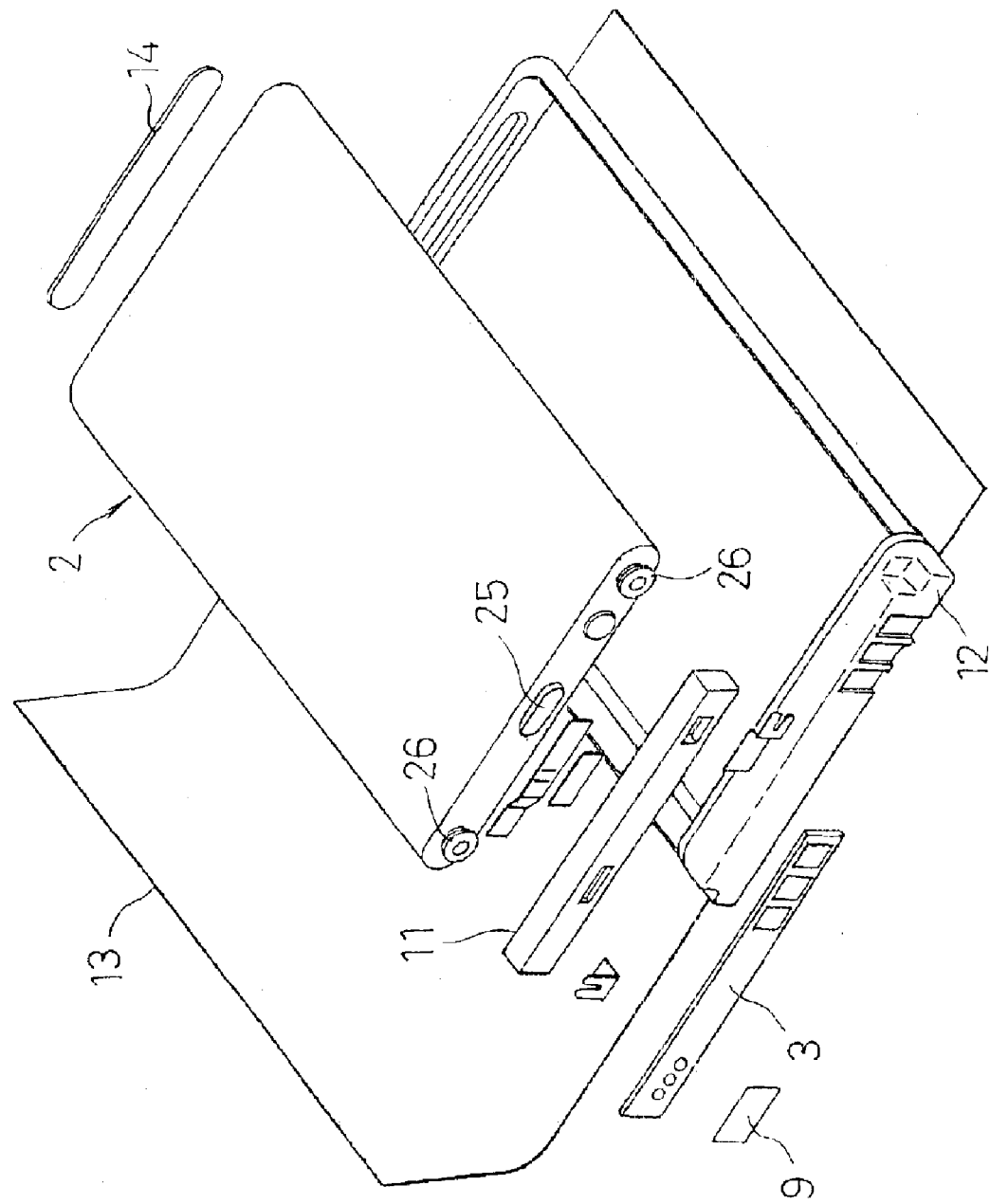

BATTERY WITH RESIN INTEGRATED RESIN SUBSTRATE

TECHNICAL FIELD

The present invention relates to a battery having an enhanced external connectivity and safety features, and to a small, thin battery pack with improved rigidity which is suitably used as a power source for portable electronic devices and the like.

BACKGROUND ART

With the remarkable development of small, thin, and high-functionality portable electronic devices, there is a growing demand for smaller, thinner, and high-capacity batteries and battery packs as the power source for these devices. Lithium batteries are known to be easily made small and to have high capacity. In particular, flat prismatic lithium ion rechargeable batteries that can be repeatedly used are suitable for the devices to be made thinner, and therefore they have been increasingly used as the rechargeable battery for portable electronic devices such as mobile phones.

Since lithium batteries have high energy density and contain a flammable organic solvent as liquid electrolyte, it is essential to take account of safety features, i.e., they need to incorporate such features as to ensure that no damage is caused to the device or injury to the user, even if the battery should fall into an abnormal condition. For example, if the battery positive and negative electrodes are short-circuited for whatever reason, a large short-circuit current flows in high energy density batteries, whereupon the inner resistance generates Joule heat and the battery temperature rises. A temperature rise in the battery leads to rapidly built-up gas pressure resulting from chemical reactions between positive electrode active materials and electrolyte, or from evaporation or decomposition of electrolyte, which may cause fire or explosion of the battery. Batteries may fall into a high-temperature state not only because of external short-circuiting but also of rechargeable battery overcharge. The same applies if the portable electronic device installed with the battery is placed near a heater, or left inside a car parked in a hot weather environment.

Lithium batteries are normally provided with safety features for preventing batteries from falling into an abnormal state and for evading a further dangerous state should the battery fall into an abnormal state. Such features may be incorporated in the battery as its own nature, e.g., active materials of the electrode plates and electrolyte may be made not to be excessively reactive, or, a polyolefin porous film may be employed for the separator because it has a "shutdown function", as the minute pores melt and close under an abnormally high temperature. A thermal fuse which shuts the I/O circuit upon an abnormal temperature rise, or a safety vent for letting out built-up internal pressure may also be provided. Cylindrical lithium batteries may further be provided with a protection feature such as a Positive Temperature Coefficient (PTC) element connected in series to the I/O circuit at the sealing end, which restricts overcurrent caused by external short-circuiting.

Smaller batteries and prismatic batteries cannot be provided with the thermal fuse or PTC element inside the battery, and therefore these components are normally disposed outside the battery and electrically connected to the battery. In the case of rechargeable batteries, they are further provided with a circuit substrate including a circuit for protecting the battery from overcharge and overdischarge, and these constituents outside the battery are all accommodated in a pack case together with the rechargeable battery to form a battery pack.

Pack cases are usually manufactured by resin molding technology, and the fabrication cost of molding dies for the resin molding tends to be high, because of which pack cases generally cause high costs. Moreover, the time required for designing the molding dies is relatively long, which makes difficult the application of battery packs to portable electronic devices such as mobile phones, which are re-modeled in short cycles. Another problem is that battery packs allow themselves to be made smaller and thinner only to a limited extent because of the limitation on the thickness moldable in resin molding and because of the need to retain certain strength of the battery pack.

In order to prevent the danger of disassembling batteries and battery packs for wrong use or for satisfying curiosity, batteries and battery packs also need to have such a design as to be hardly disassemblable or a design which alerts the user that the batteries have been disassembled. Also, taking account that they are used for portable electronic devices, batteries and battery packs are required to have a rigid structure which can withstand vibration or shocks in a falling accident, as well as a water-proof structure particularly for the electronic circuit portion. In response to these demands, there have been proposals to unite a circuit substrate including battery protection circuits and a battery by resin molding, so as to realize a hardly disassemblable, rigid, water-proof structure.

The applicants of the present invention have so far proposed a resin mold battery pack in Japanese Patent Application Nos. 2000-320166 and 2000-363518, in which a rechargeable battery and a circuit substrate are fixedly connected by a connection member and placed inside a molding die as an intermediate product, and resin is filled around the intermediate product such as to expose external terminals on the circuit substrate to the outside, to unite the rechargeable battery and the circuit substrate.

Japanese Patent Laid-Open Publication No. 2000-315483 discloses a structure wherein a rechargeable battery and a circuit substrate connected by a connection member are placed inside a molding die, and the substrate is resin-packed and fixed on the battery or its lid case, or both the substrate and the battery are resin-packed.

To mount electronic components such as the above-mentioned thermal fuse or PTC element on small batteries used as a power source for portable electronic devices, these need to be accommodated with the battery in a case in the form of a battery pack, which tends to cause high costs. On the other hand, it is important that these thermo-sensitive elements (thermal fuse and PTC elements) are disposed in heat-coupled arrangement with the battery, i.e., they need to be united with the battery. Thus, there is a demand for a one-piece structure which is not like a conventional battery pack but allows a thermo-sensitive element outside the battery to be united with the battery.

In rechargeable batteries, battery temperature is detected for controlling charge level and other safety features. Therefore, rechargeable batteries include a temperature detection sensor such as a thermistor contacted thereto which inputs detected information to the control circuit. Their external terminals are exposed to contact terminals on the charger side. In order to provide such a temperature detection sensor, the rechargeable battery needs to be designed as a battery pack, which requires a larger number of steps in its manufacture process and tends to cause high costs because of the need to provide a structure to ensure precise detection of battery temperature.

Positive and negative electrodes of small batteries are formed on different surfaces because of their size restriction. If they were formed on the same plane or on any arbitrary surface easy for connection, they would be much more conveniently used. For example, since cylindrical batteries normally have their positive and negative electrodes on the opposite ends, the device in which the batteries are used requires to have connection members for both electrodes on both sides of the battery accommodating space. Prismatic batteries have their positive and negative electrodes on the sealing end, but they are formed on different, stepped surfaces, causing the external connection structure to be complex. Thus, there is a demand for a simpler external connection structure for positive and negative electrodes of batteries in accordance with the trend of smaller and thinner devices.

When uniting a battery and a circuit substrate by resin molding, there was a problem that resin does not form good enough a form with the battery or substrate, and so it was necessary to encapsulate the battery and substrate by a resin mold package, resulting in a structure very similar to a battery pack in which a battery and a substrate are accommodated in a resin mold pack case. This was contrary to the demand for smaller and thinner batteries.

In the structure disclosed in the above-mentioned Japanese Patent Laid-Open Publication No. 2000-315483, the circuit substrate is first fixed to the battery by a double-sided adhesive tape before resin molding is performed such that resin covers at least three faces of the battery. While the battery and substrate are fixed to each other, resin itself is not bonded to the metal surfaces. Therefore, there is the risk that resin mold package may peel off from the battery if subjected to vibration or shocks. If the batteries and battery packs are designed mainly for portable electronic devices, resin mold package should be engaged firmly with metal surfaces of the battery, since vibration and shocks are inevitable.

In the above-mentioned prior art, the battery pack has an external connection structure in which connectors are provided at the tips of the leads drawn out from the resin-packed circuit substrate to the outside for male-female connection coupling with the device side. This will present no problem if the device is large and offers enough space for accommodating the battery. The battery packs to which the present invention is directed are primarily designed for small devices where battery accommodation space is scarce, and therefore cannot adopt such external connecting structure. Instead, the battery and battery pack of the present invention need to have a connection structure in which, when the battery or battery pack is inserted in the space provided on the device side, the connection terminals or probes on the device come into pressure contact with external terminals exposed to the outside in a predetermined position of the battery or battery pack. If the battery pack is constructed to contain a battery and a circuit substrate formed with external terminals and if these terminals are to be brought into pressure contact with the connection terminals on the device side in the battery accommodating space with low contact resistance, the battery pack must have very accurate outer dimensions and its external terminals must be located precisely. If the dimensional precision is low, the contact resistance between the device-side connection terminals and external terminals will become high, leading to malfunctions such as contact failure and voltage drop.

An object of the present invention is to provide a battery united with a substrate by resin molding and a battery pack of a battery and a substrate united by resin molding.

DISCLOSURE OF THE INVENTION

To achieve the above object, a battery according to a first aspect of the present invention includes a single battery or a battery consisting of a plurality of cells connected to one another, a circuit substrate including a protection circuit element for the battery and external terminals, and a resin mold package interposed between the circuit substrate and the battery for uniting the battery and the circuit substrate. The protection circuit element is mounted on one side of the circuit substrate opposite one end face of the battery where one of terminals of the battery is disposed. The external terminals are provided on the opposite side from the protection circuit element of the circuit substrate. The resin mold package covers and provides electrical insulation between the one end face of the battery and one side of the circuit substrate where the protection circuit element is mounted.

The circuit substrate is integrated with the battery by the resin mold package, and the protection circuit element mounted on one side of the circuit substrate is covered by the resin mold package and insulated from the positive and negative terminals of the battery and leads connecting these terminals to the circuit substrate. In other words, the resin mold package has two functions: one is to connect and unite the battery and circuit substrate, and the other is to insulate and cover the protection circuit element. The external terminals are formed on the other side of the circuit substrate, and the substrate is integrated with the battery so that the external terminals face the outer side, where they serve as charge/discharge terminals of the battery. Batteries having such construction do not necessitate a retaining member for holding the circuit substrate when encased in an outer case of a battery pack, or a connection member for connecting the substrate with external terminals and the battery. This improves the freedom of design for the outer case, leading to a reduction in the period required for the development of new products, and allows for generalized use of outer cases. Further, since the structure of the battery pack is simplified, costs for the battery packs are accordingly reduced. Moreover, the resin mold package which provides insulation between thermal fuses or PTC elements mounted on plain batteries and circuit substrate, and between the leads connecting various constituents, enables high-density arrangement of battery elements, whereby volume efficiency of the battery is much improved.

A battery according to a second aspect of the present invention includes a plain battery, a substrate on which at least external terminals are formed, a connection member for electrically connecting the substrate and the plain battery, a resin mold package formed by filling resin such as to bond predetermined faces of the plain battery and the substrate so as to integrate the two, and engaging means for engaging the resin mold package with the plain battery and/or the substrate.

In the battery described above, the plain battery and substrate are integrated by the resin mold package, and the positive and negative electrodes of the plain battery are electrically connected to the external terminals on the substrate by the connection member. Thus, the positive and negative external terminals are formed on the same plane. The resin mold package is firmly joined to the plain battery and/or substrate by the engaging means. Thus, the plain battery and the substrate are firmly united together to form a substrate-integrated battery.

A battery according to a third aspect of the present invention includes a plain battery, a substrate on which at least external terminals are formed, a connection member for electrically connecting the substrate and the plain battery, a resin mold package formed by filling resin such as to bond predetermined faces of the plain battery and the substrate so as to integrate the two, engaging means for engaging the resin mold package with the plain battery and/or the substrate, and an outer cover for covering the outer face of the plain battery with the substrate, wherein at least the external terminals are exposed to the outside.

In the battery described above, the plain battery and substrate are integrated by the resin mold package, and further, the outer cover is provided, which allows at least the external terminals on the substrate to be exposed. Thus, the plain battery and substrate are integrated more rigidly, and at the same time, the outer appearance can be improved, leading to enhanced commercial value.

In the battery described above, the engaging means can be formed in the shape of an undercut protrusion having an anchoring function with respect to the resin mold package, and provided on a portion of the plain battery and/or the substrate where the resin mold package is bonded. Alternatively, the engaging means can be a resin bond material capable of forming a bond with the resin mold package and with metal, and provided on a portion of the plain battery and/or the substrate where the resin mold package is bonded. Thereby, it is ensured that the resin mold package is firmly joined to the plain battery or the substrate.

The connection member may be a thermo-sensitive element having a lead, whereby the plain battery is connected to the substrate. Thus, the plain battery and substrate are connected to each other through a thermo-sensitive element such as thermal fuse or a PTC element, whereby the connection circuit will have battery protection features against high temperatures and external short-circuiting.

The outer cover may include an upper resin mold piece covering at least part of the substrate and the resin mold package while exposing the external terminals to the outside, a lower resin mold piece covering the opposite side face from the substrate of the plain battery, and a wrapping sheet for wrapping part of the upper resin mold piece and the lower resin mold piece and a body part of the plain battery. Thereby, a rigid one-piece structure is achieved without unnecessarily increasing the thickness of the battery, and the outer appearance is improved. To make the one-piece structure even firmer, a coupling resin mold piece may be provided for joining the upper resin mold piece and the lower resin mold piece.

A battery pack according to a fourth aspect of the present invention includes a single battery or a battery consisting of a plurality of cells connected to one another, a circuit substrate including a protection circuit element for the battery and external terminals, a first frame supporting the circuit substrate and one end face of the battery and having an aperture for exposing the external terminals, a second frame holding the other end face of the battery, and a pair of coupling members connecting the first and second frames along shorter side edges of the battery.

With the structure described above, both end surfaces of the battery pack have sufficient mechanical strength to withstand possible external impacts, i.e., by the first frame holding one end surface of the battery and circuit substrate, and by the second frame holding the other end surface of the battery. Further, these frames and the battery are coupled and packed together. Thus, the structure will serve as a sufficiently rigid outer case and withstand large impacts in a falling accident or the like.

The coupling members are provided for ensuring that the outer case is protected against external impacts. They connect the first and second frames, and should preferably be formed in tight contact with shorter side edges of the battery. Combined with such resin mold piece around the periphery, the battery will be solid enough. The coupling members, however, are of such structure that they have minimum thickness and width necessary to provide the desired protection. The battery pack is thus designed to be simple and lightweight. The coupling members formed along the shorter side edges of the battery pack thus contribute to improved reliability of the battery pack, lower cost of the outer case, and lighter weight of the battery pack. The first and second frames and coupling members should preferably be made of thermoplastic resin, taking account of productivity and dimension precision.

The battery pack described above should preferably have a sheet covering an exposed surface of the battery and forming part of an outer cover member integrally with the first and second frames. The wrapping sheet wraps around the peripheral side surface of the battery such as to envelop the battery so that the battery case serving as one terminal is not exposed. Various materials can be used for this wrapping sheet, e.g., a thermoplastic resin material may be used together with an adhesive in the form of a film, and preferably heat-shrinking property may be added to such a film. The sheet will have the function of the outer case of conventional battery packs, and so needs to be wound in tight contact with the side surface of the battery around its entire periphery. At least the leading and end portions of the sheet will have to be fixed in position. Since the sheet is wound over the side faces of the first and second frames, it helps further increase the strength of the battery pack. The leading and end portions of the wrapping sheet may be apart from each other, but preferably, they should be overlapped or abutted. If the sheet is very thin, it may be wound around the battery more than one turn.

The battery pack described above may further have a resin mold package uniting the battery and the circuit substrate and covering the surface of the circuit substrate where the circuit protection element is mounted for providing electrical insulation, the first frame being formed such as to surround this resin mold package. With this structure, the same effects as with the case with the battery alone described above can be achieved, and in addition, the portion including the circuit substrate and the first frame will form an even stronger bond, thereby increasing the strength of the battery pack. Preferably, the first frame, the second frame, and the pair of coupling members are formed integrally, so as to simplify the resin forming process.

A battery pack according to a fifth aspect of the present invention includes one or a plurality of batteries, a substrate including external terminals, a resin mold package for integrating the battery and the substrate, and a resin mold piece covering at least part of the resin mold package and the circuit substrate while exposing the external terminals to the outside.

In the battery pack described above, the battery and substrate are integrated by the resin mold package, and further, the resin mold piece covers the substrate and the resin mold package, functioning as a pack case made of resin. Thus, a battery pack of a battery integrated with a substrate is obtained. The substrate and the resin mold package are covered by the resin mold piece only at necessary portions, and therefore the battery pack can be made smaller and thinner, and also the cost is made lower. The resin mold piece allows the external terminals formed on the substrate to be exposed through apertures therein, so that the terminals can be formed at any given location on the substrate. This improves the freedom of design of the battery pack.

A battery pack according to a sixth aspect of the present invention includes one or a plurality of batteries, a substrate formed with at least external terminals, a connection member for electrically connecting the substrate and the battery, a resin mold package formed by filling resin such as to bond predetermined faces of the battery and the substrate so as to integrate the two, and engaging means for engaging the resin mold package and the battery and/or the substrate.

In the battery pack described above, the battery and substrate are integrated by the resin mold package, and the positive and negative electrodes of the battery are electrically connected to the external terminals on the substrate by the connection member. Thus, the positive and negative external terminals are formed on the same plane. The resin mold package is firmly joined to the battery and/or substrate by the engaging means. Thus, the battery and the substrate are firmly united together to form the battery pack. The substrate can accommodate battery protection circuits and safety circuits for protecting the battery from overcharge, overdischarge, and external short-circuiting, whereby battery explosion and other accidents induced by high temperatures are prevented.

A battery pack according to a seventh aspect of the present invention includes one or a plurality of batteries, a substrate formed with at least external terminals, a connection member for electrically connecting the substrate and the battery, a resin mold package formed by filling resin such as to bond predetermined faces of the battery and the substrate so as to integrate the two, engaging means for engaging the resin mold package and the battery and/or the substrate, and an outer cover for covering the outer face of the battery with the substrate, wherein at least the external terminals are exposed to the outside.

In the battery pack described above, the battery and substrate are integrated by the resin mold package, and further, the outer cover is provided, which allows at least the external terminals on the substrate to be exposed to the outside. Thus, the battery and substrate are integrated more rigidly, and at the same time, the outer appearance can be improved, leading to enhanced commercial value. The substrate can accommodate battery protection circuits and safety circuits for protecting the battery from overcharge, overdischarge, and external short-circuiting, whereby battery explosion and other accidents induced by high temperatures are prevented. The battery pack mainly used as the power source for portable electronic devices is thus given enhanced features and improved rigidity.

In the battery pack described above, the engaging means may be formed in the shape of an undercut protrusion having an anchoring function with respect to the resin mold package, and provided on a portion of the battery and/or the substrate where the resin mold package is bonded. Such engaging means engages with the resin mold package and ensures that the resin mold package and battery and/or substrate remain united. Thus, a rigid one-piece structure is achieved, which is hardly disassembled. If it should be disassembled, it will appear quite obviously as "disassembled", and therefore it is unlikely to be put in wrong use or cause any accidents. Alternatively, the engaging means may be a resin bond material capable of forming a bond with the resin mold package and with metal, and provided on a portion of the battery and/or the substrate where the resin mold package is bonded. The same effects will be achieved.

The connection member may be a thermo-sensitive element having a lead, whereby the plain battery is connected to the substrate. Thus, the battery and substrate are connected to each other through a thermo-sensitive element such as thermal fuse or a PTC element, whereby the connection circuit will have battery protection features against high temperatures and external short-circuiting.

The outer cover may include an upper resin mold piece covering at least part of the substrate and the resin mold package while exposing the external terminals to the outside, a lower resin mold piece covering the opposite side face from the substrate of the rechargeable battery, and a wrapping sheet for wrapping part of the upper resin mold piece and the lower resin mold piece and a body part of the rechargeable battery. Thereby, a rigid one-piece structure is achieved without unnecessarily increasing the thickness of the battery, and the outer appearance is improved. To make the one-piece structure even firmer, a coupling resin mold piece may be provided for joining the upper resin mold piece and the lower resin mold piece.

When constructing the battery pack with a plurality of rechargeable batteries, they are arranged side by side and resin is filled in the gaps between them. A plurality of rechargeable batteries are thereby firmly united together as a battery pack.

Connecting the upper resin mold piece and the lower resin mold piece by forming a coupling resin mold piece will further improve the strength of the integral structure, as the separate resin mold pieces are coupled together. It will make the battery pack suitable for portable electronic devices which tend to be subjected to vibration and shocks.

BRIEF DESCRIPTION OF THE DRAWINGS

FIG. 9 is an exploded perspective view showing various components of the battery pack;

BEST MODE FOR CARRYING OUT THE INVENTION

For a better understanding of the present invention, preferred embodiments of the invention will be hereinafter described with reference to the accompanying drawings. It should be understood that the following description of the invention is merely given as one example of the invention and restricts in no way the technical scope of the invention.

Figure 1A:
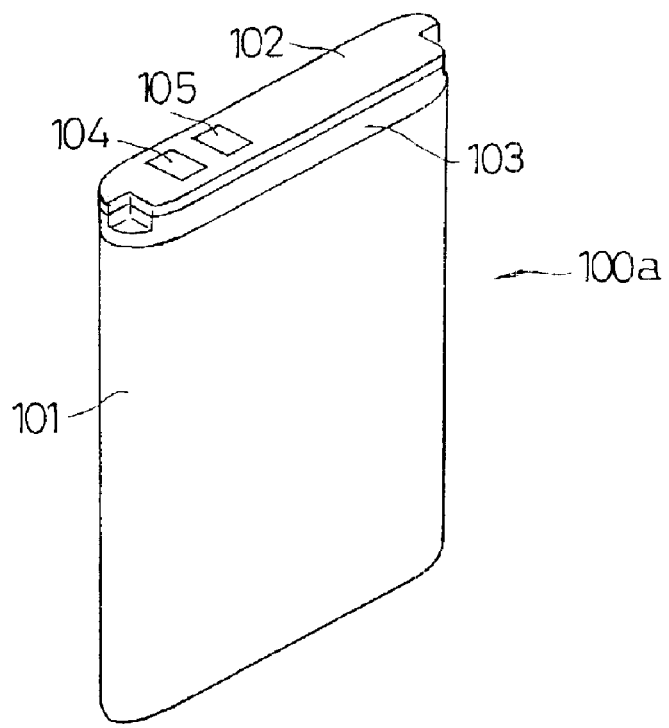
FIGS. 1A and 1B are perspective views showing the outer appearance of a battery according to one embodiment of the present invention.
Figure 1B:
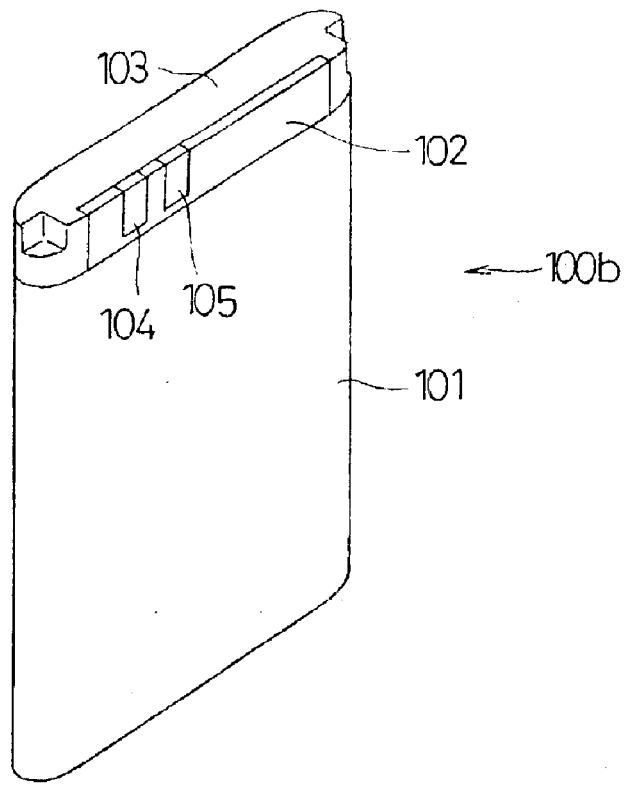

FIGS. 1A and 1B are outer representations of batteries 100a, 100b according to a first embodiment of the invention, which are flat prismatic lithium ion rechargeable batteries. A plain battery 101 is integrated by means of a resin mold package 103 with a terminal plate 102 that is connected to the positive and negative electrodes of the battery 101. Battery's positive external terminal 104 and negative external terminal 105 are formed on the outer face of the terminal plate 102. Battery 100a has its positive external terminal 104 and negative external terminal 105 on its top, as its terminal plate 102 is disposed on top of the plain battery 101 parallel to its sealing surface. Battery 100b, on the other hand, has its positive external terminal 104 and negative external terminal 105 on a side face at one end, as its terminal plate 102 is disposed parallel to the side face of the plain battery 101.

Figure 2A:
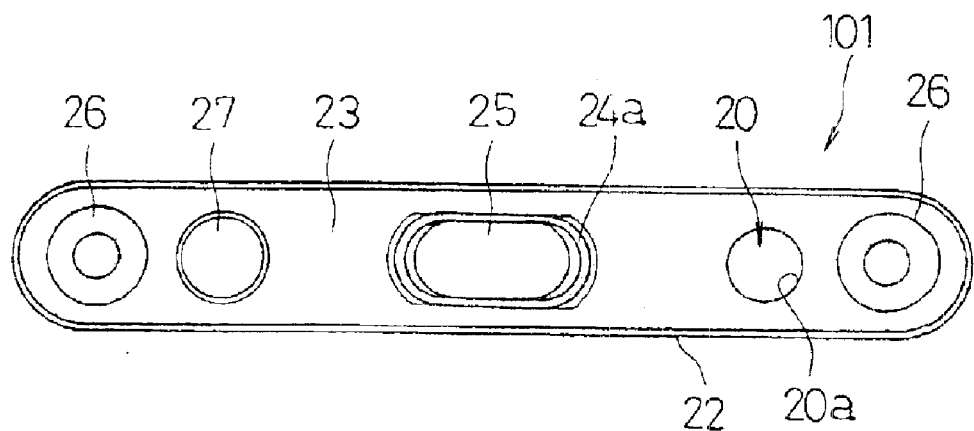
FIG. 2A is a top plan view and FIG. 2B is a cross-sectional view, both showing the configuration of the plain battery.
Figure 2B:
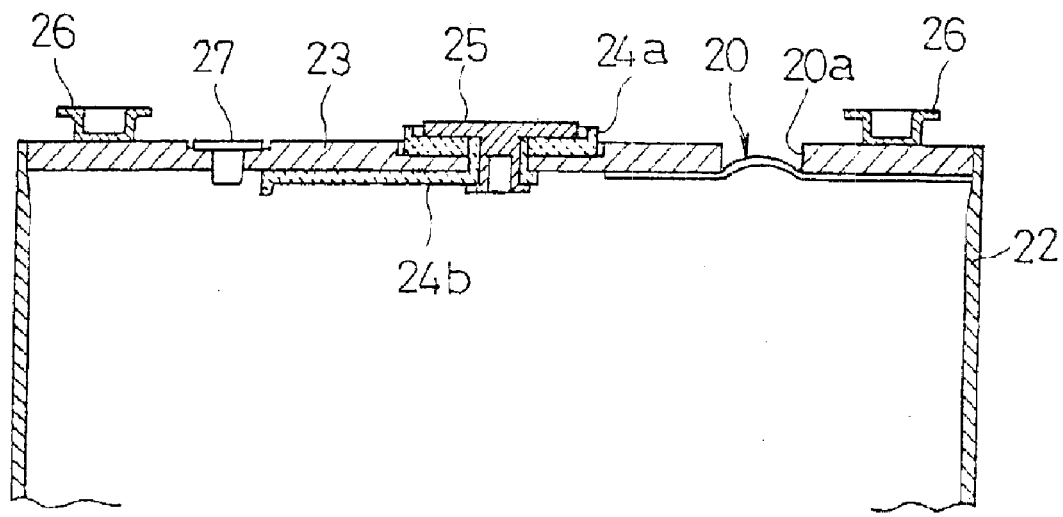

The plain battery 101 is made up of a bottomed cylindrical aluminum battery case 22 having an ellipse cross section as can be seen from FIGS. 2A and 2B and elements for generating electromotive force accommodated in the case. The open end of the battery case is sealed with a sealing plate 23 by laser welding. The sealing plate 23 is joined to the battery case 22 and serves as the battery's positive electrode. A rivet 25 which constitutes the battery's negative electrode is fixedly attached to the center of the sealing plate 23 via an upper gasket 24a and a lower gasket 24b that provide electrical insulation from the sealing plate. Part of the sealing plate 23 is made of a clad sheet of metal foils, and this part forms a safety vent 20 with a vent hole 20a. On both sides of the sealing plate 23 are a pair of engaging members 26 for coupling the resin mold package 103 to the plain battery 101. The engaging members 26 may be made either integrally with the sealing plate 23 by press-forming, or separately and welded to the sealing plate 23. Reference numeral 27 denotes a plug for closing an electrolyte injection hole. Liquid electrolyte is injected into the battery case 22 through the hole, which is then closed by the plug 27, and the plug 27 is then welded to the sealing plate 23.

Figure 3A:
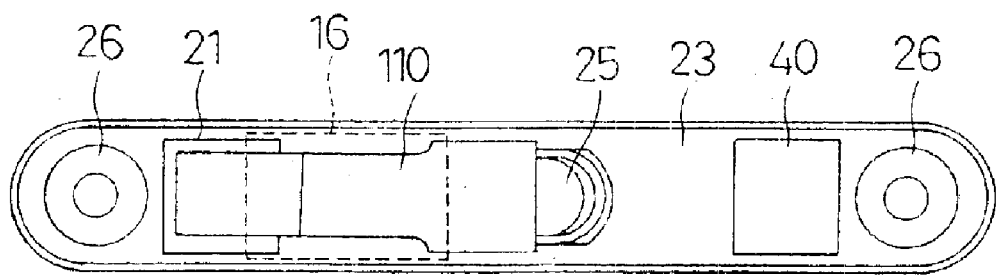
FIG. 3A is a top plan view and FIG. 3B is a cross-sectional view, both showing the state of the plain battery equipped with a PTC element.
Figure 3B:
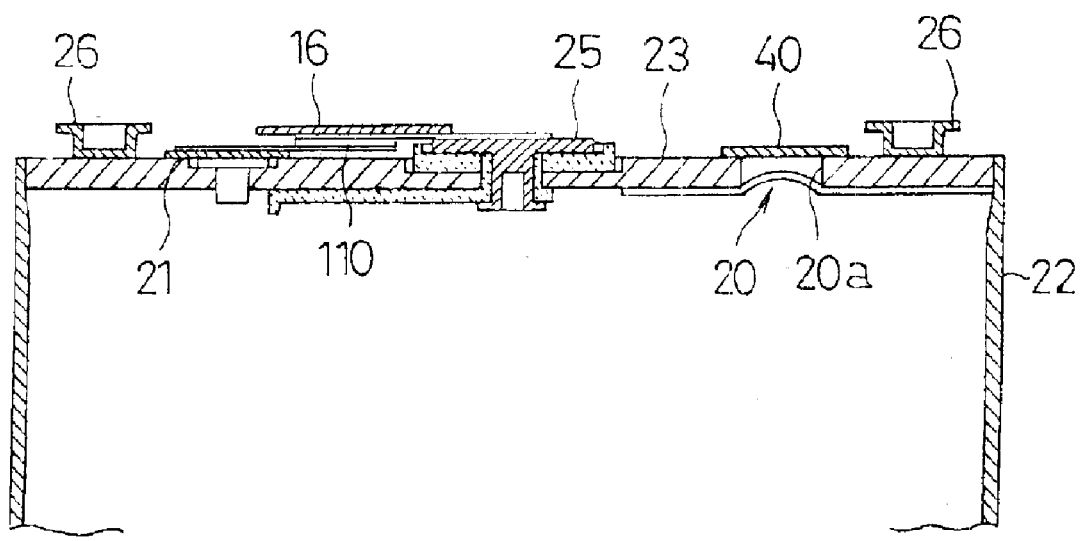

A PTC element 110 including electrode plates is attached to this plain battery 101 as shown in FIGS. 3A and 3B. One of the electrode plates is bonded to the rivet 25, while the other of the electrode plates is positioned upon an insulation sheet 21 affixed to the sealing plate 23, and bonded to a positive lead plate 108 to be described later. A heat insulation sheet 16 is placed upon the PTC element 110 in order to prevent heat deterioration thereof during the resin filling and molding processes which will be described later. The vent hole 20a of the safety vent 20 is covered by a resin sheet 40.

Figure 4A:
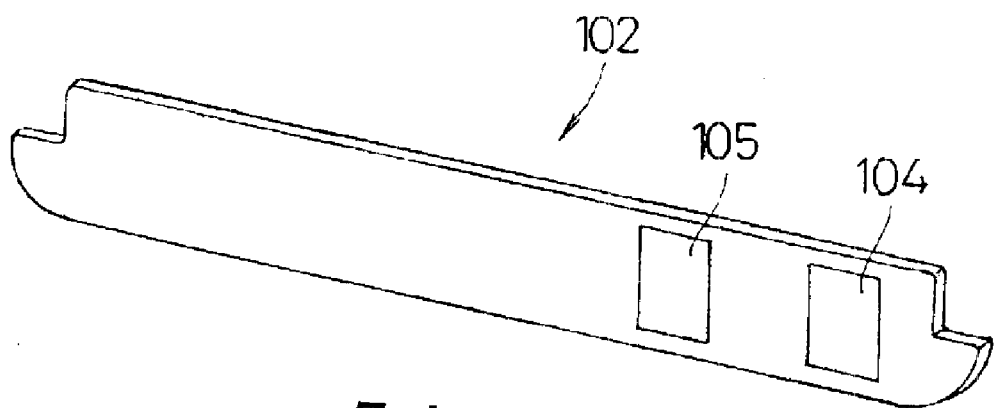
FIG. 4A is a perspective view showing the configuration of the outer side of a terminal plate.
Figure 4B:
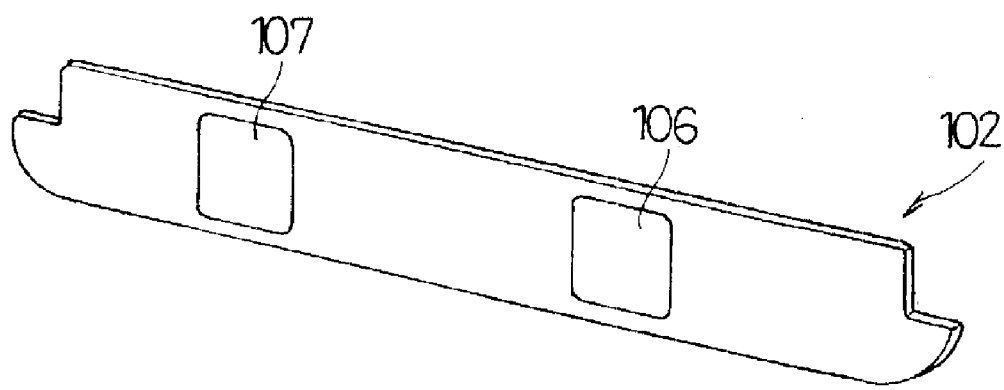
FIG. 4B is a perspective view showing the configuration of the inner side of the terminal plate.

The terminal plate 102 is formed with the positive external terminal 104 and the negative external terminal 105 on one side which will face the outside as shown in FIG. 4A. On the opposite side or the inner side which will face the plain battery 101 are formed a positive electrode connecting land 106 and a negative electrode connecting land 107 for establishing electrical connection with the plain battery 101. The positive and negative external terminals 104, 105 can be formed by etching a copper foil layer affixed on the plate surface, or alternatively by attaching separate terminal members on the plate surface. Battery 100b having its positive and negative external terminals 104, 105 on its side face is suitably used for applications where the battery's external terminals are brought into sliding contact with connection terminals on the side of the device which is being used. It is therefore preferable, in the case with the battery 100b, to employ plate-like terminal members attached to the terminal plate 102. One side of the terminal plate 102 is electrically connected to the other side via through holes and predetermined circuit patterns (not shown).

Figure 4C:
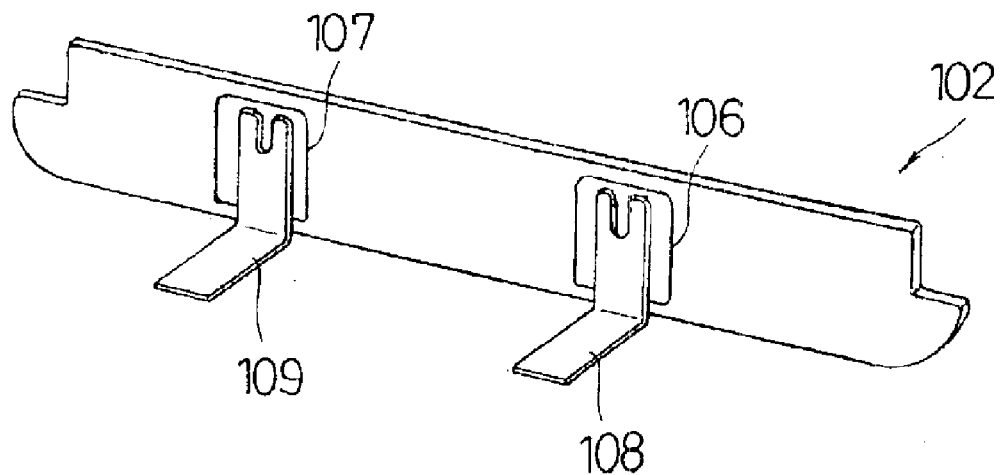
FIG. 4C is a perspective view showing the state of the terminal plate equipped with a lead plate.
Figure 5A:
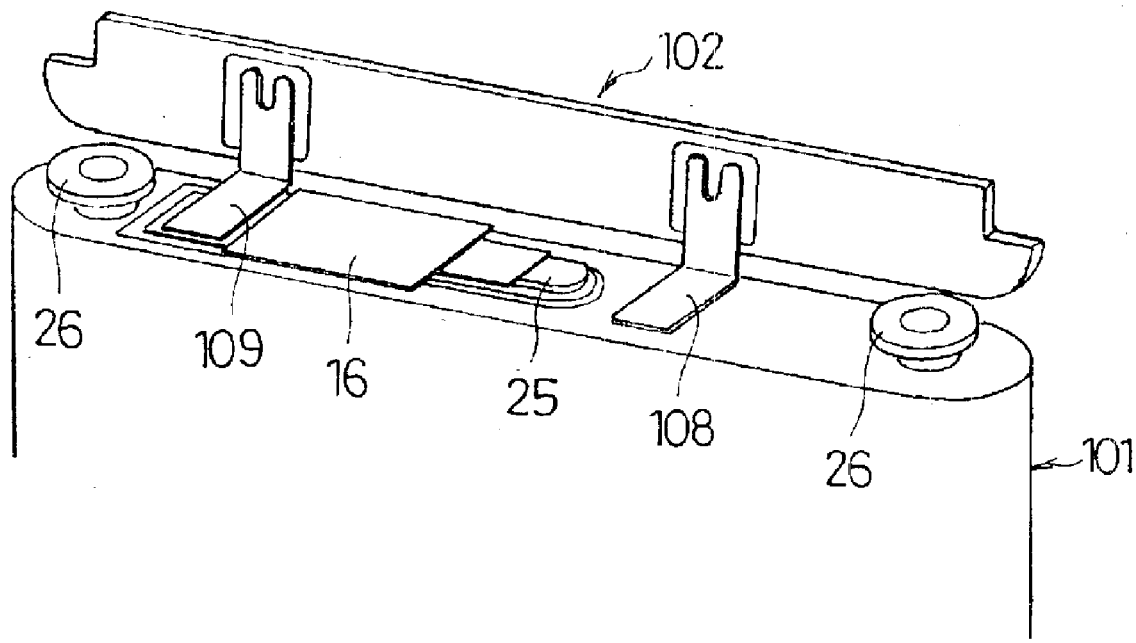
FIGS. 5A and 5B are perspective views showing how the terminal plate is attached to the plain battery.
Figure 5B:
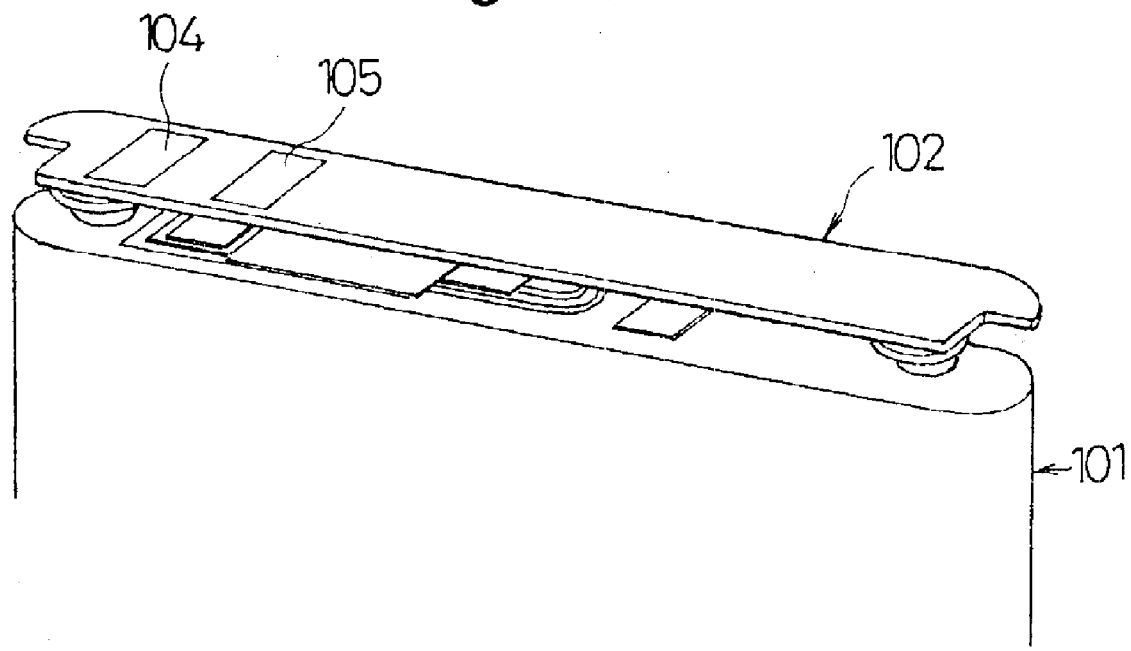

To the positive electrode connecting land 106 and the negative electrode connecting land 107 are bonded one ends of the positive lead plate 108 and the negative lead plate 109, respectively, by soldering, as shown in FIG. 4C. As shown in FIGS. 5A and 5B, the terminal plate 102 is mounted to the plain battery 101 in electrical connection therewith, with the other end of the positive lead plate 108 being bonded to the sealing plate 23 and the other end of the negative lead plate 109 being bonded to the other of the electrode plates of the PTC element, 110. To make the battery 100a shown in FIG. 1A, the positive and negative lead plates 108, 109 are folded so that the terminal plate 102 is parallel to the sealing plate 23 as shown in FIG. 5B. To make the battery 100b shown in FIG. 1B, they are bent at right angles to the sealing plate 23 as shown in FIG. 5A.

Figure 6A:
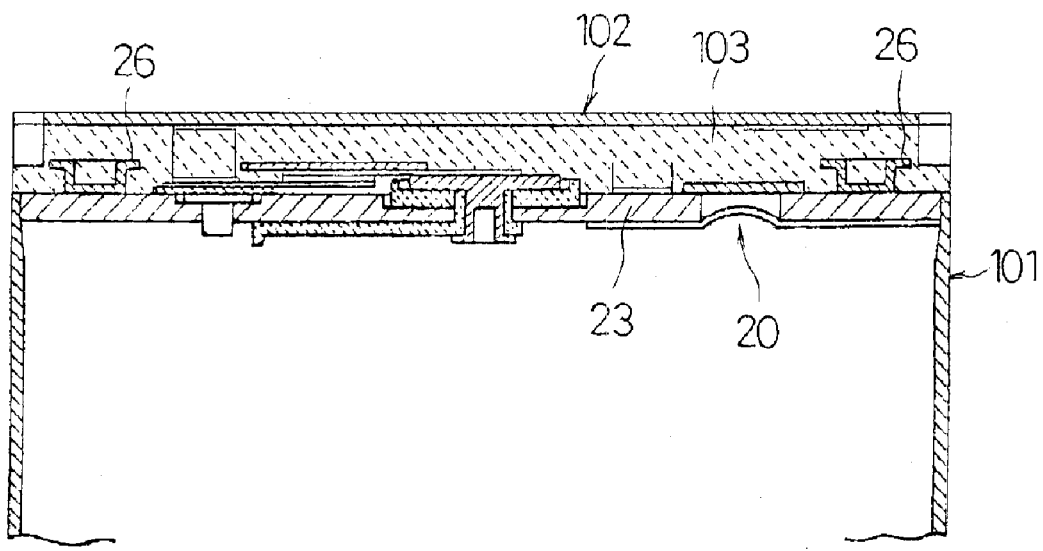
FIGS. 6A and 6B are cross-sectional views of the plain battery and the terminal plate united by means of a resin mold package.

After connecting the terminal plate 102 to the plain battery 101, resin is filled between the plain battery 101 and the terminal plate 102 as shown in FIG. 6A to make them integral with each other. While the bond between the mostly metal surface of plain battery 101 and resin mold package 103 is generally poor, the engaging members 26 attached on the sealing plate 23 serve as anchors to the resin mold package 103 as they are surrounded by the resin and grip the resin mold package 103 with their undercuts. Thus, the resin mold package 103 is joined to the plain battery 101. The terminal plate 102 also engages with the resin mold package 103 with their positive and negative lead plates 108, 109 embedded therein. The terminal plate 102 may be provided with rivet-like protrusions similar to the engaging members 26 so as to strengthen the bond between itself and the resin mold package. Thermoplastic polyamide resin is suitable for the filling resin. Polyamide resin exhibits excellent bonding strength, electrical insulation, and chemical resistance. Since this resin can be molded at a temperature in a range of from 190 to 230° C., any adverse thermal effects to the plain battery 101 or the PTC element 110 can be avoided.

The interface between the terminal plate 102 and the resin mold package 103 and that between the plain battery 101 and the resin mold package 103 may be coated with an adhesive which exhibits high bond strength between resin and metal, so as to strengthen the bond of the resin mold package 103 with the plain battery 101 and with the terminal plate 102. Any adhesive made of, for example, hot melt polyamide resin, epoxy resin, or modified silicon resin can suitably be used.

In the batteries 100a, 100b described above, if the positive and negative external terminals 104, 105 should be short-circuited for whatever reason, an excessive short-circuit current causes the PTC element 110 to heat up. The PTC element 110 has a very low resistance under normal temperature, but when it exceeds its predetermined trip temperature, it increases its resistance drastically so as to rapidly reduce the short-circuit current, preventing the plain battery 101 from exploding because of the high temperature caused by short-circuiting. The "trip" of the PTC element 110 which is triggered by a temperature rise occurs also when the plain battery 101 is exposed to high temperature, thereby preventing the plain battery 101 from being used under a high temperature environment. The built-in PTC element 110 thus provides the batteries 100a, 100b with the safety feature.

A temperature rise to an abnormal level in the batteries 100a, 100b, and the subsequent built-up of gas inside the plain battery 101 may cause explosion of the plain battery 101. In the batteries 100a, 100b, when the built-up gas pressure reaches a certain level which activates the safety vent 20, the metal foil portion of the safety vent 20 will break to release the built-up internal pressure to the outside. Since the vent hole 20a above the safety vent 20 is closed by the resin sheet 40 and covered by the resin mold package 103, the gas is let out from the vent hole 20a through the interface between the resin sheet 40 and resin mold package 103 and the plain battery 101 to the outside. Thus, explosion of the plain battery 101 because of a temperature rise is prevented. The batteries 100a, 100b thus include double safety features together with the PTC element 110.

Figure 6B:
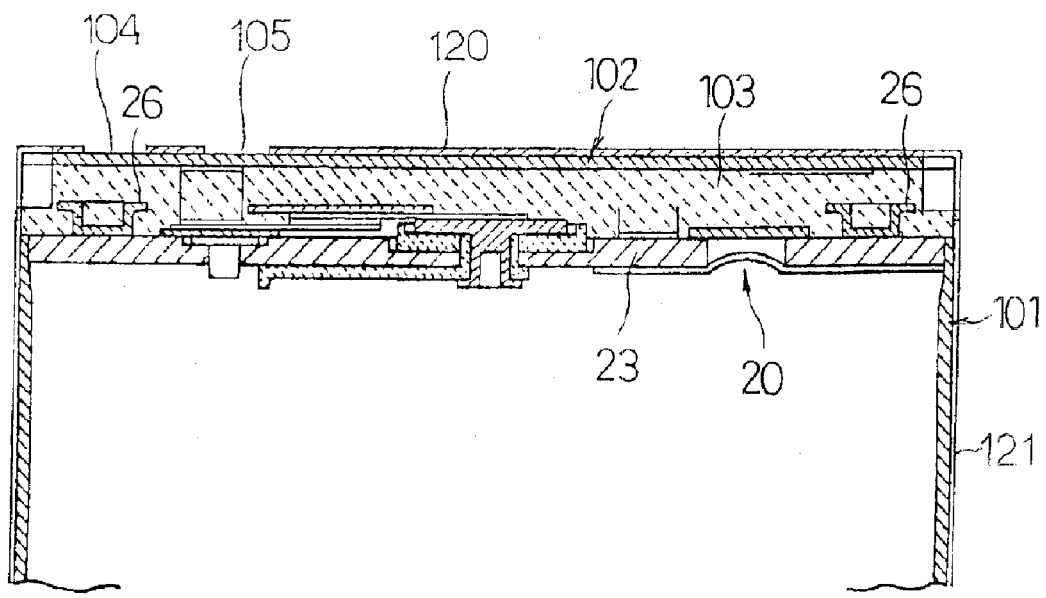
Figure 7A:
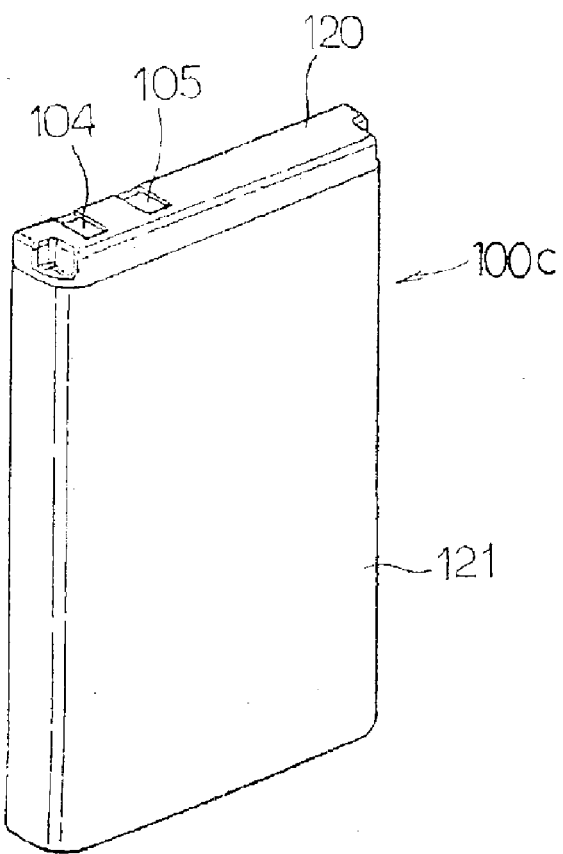
FIGS. 7A and 7B are perspective views of a battery with an outer cover.
Figure 7B:
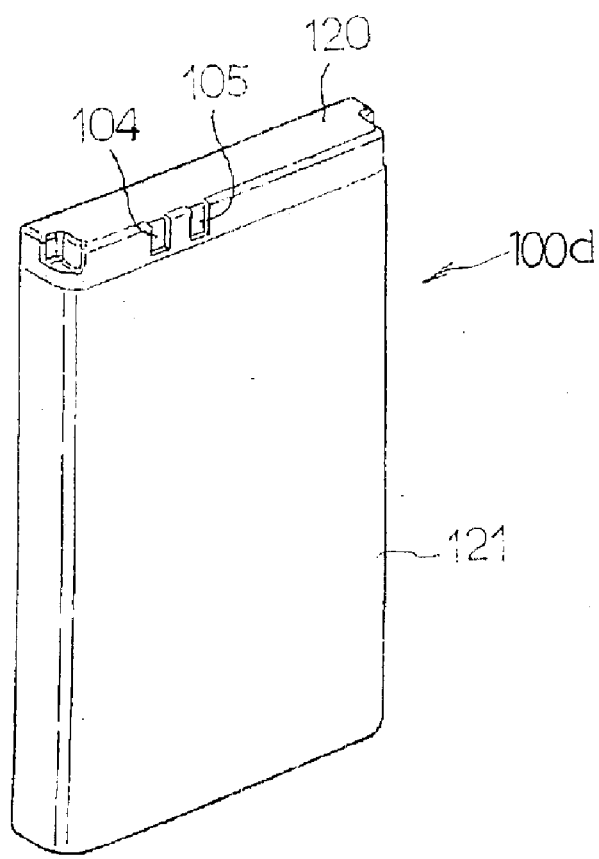

The thus constructed batteries 100a, 100b are further provided with an outer cover to improve the external appearance and strength. The outer cover consists of a secondary mold piece 120 which has openings above the positive and negative external terminals 104, 105 and covers the top of the terminal plate 102 and the peripheral side face of the resin mold package 103, and a wrapping sheet 121 wound around the side faces of the plain battery 101 as shown in FIG. 6B. The resultant batteries 100c, 100d appear as shown in FIGS. 7A and 7B. The wrapping sheet is made of resin such as polypropylene, polyethylene terephthalate, polycarbonate, or a resin composite material containing these resins, and coated with an adhesive to be bonded to the batteries 100a, 100b. Alternatively, the wrapping sheet may be made of a film having a desired characteristic so that the battery has a certain enhanced feature. For example, it may be made of a fiber-reinforced film having glass fiber dispersed therein instead of resin, so as to increase the strength of the battery. Alternatively, the wrapping sheet may be provided with a layer for shielding electromagnetic interference (EMI), by dispersing nickel powder or carbonyl iron powder in acrylic prepolymer with high density. A wrapping sheet with such shield layer will suppress the EMI not only to electronic components mounted on the terminal plate 102 but also to an electric device in which the battery is installed.

Moreover, the wrapping sheet may have various colors and patterns. If the battery pack is to be installed in a device such that it is exposed, the wrapping sheet may accordingly have matching color and tone.

The following is a description of a battery pack according to a second embodiment of the present invention. The battery pack of this embodiment is used for a mobile phone and constructed with a flat prismatic lithium ion rechargeable battery. Battery packs for mobile phones need to be small, light-weight, and thin, and in addition, they are desired to have a high energy density to exhibit a high functionality, a high mechanical strength to withstand impacts caused by a falling accident which is inevitable with a portable device, a structure which does not allow it to be easily disassembled, and safety features for protecting the rechargeable battery from short-circuiting, overcharge, and high temperature. The battery pack described below satisfies all these requirements.

Figure 8:
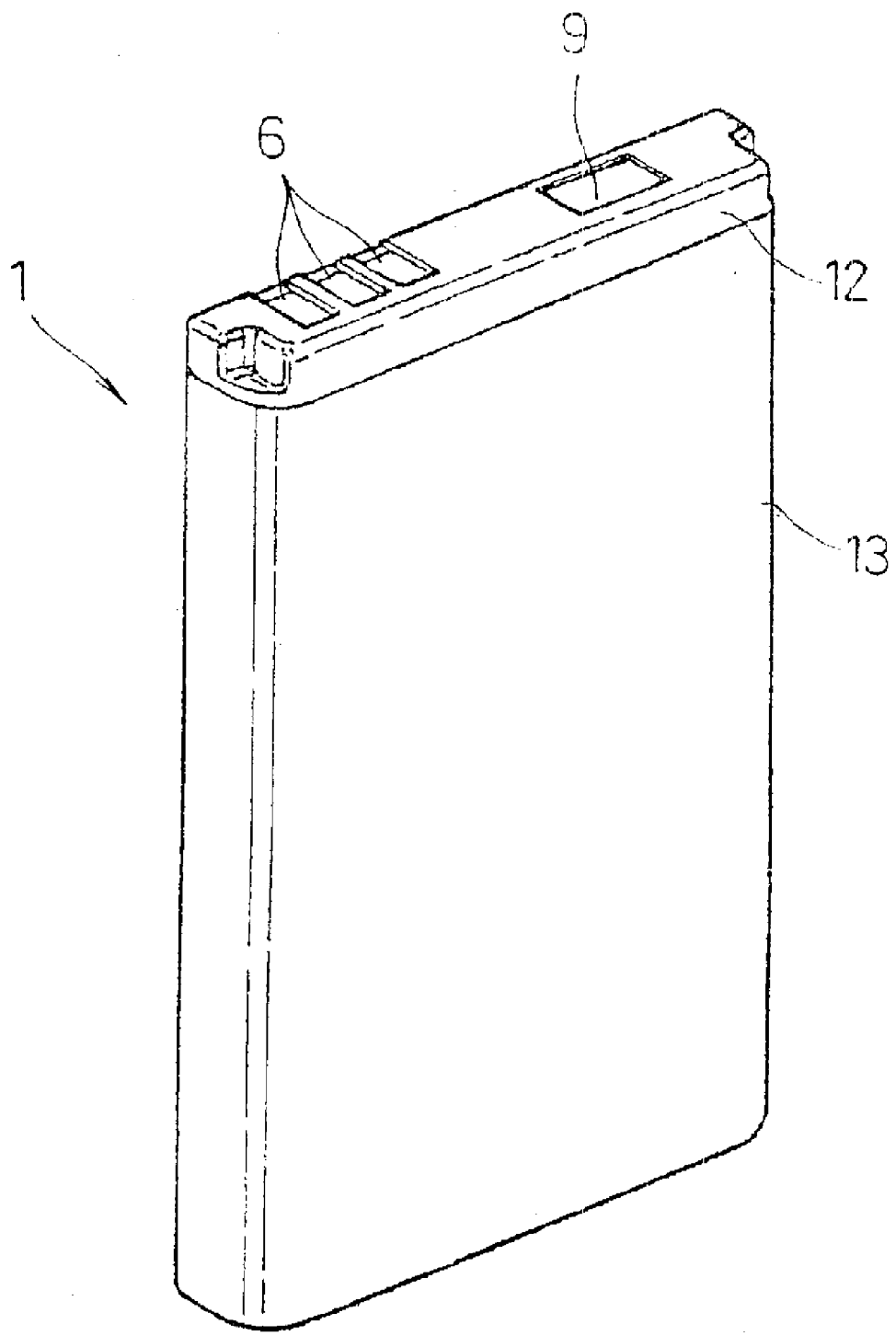
FIG. 8 is a perspective view showing the outer appearance of a battery pack according to one embodiment of the invention.

FIG. 8 is an outer representation of a battery pack 1 according to this embodiment. On one end face of the flat battery pack are exposed external terminals 6 consisting of a positive terminal, a negative terminal, and a temperature detecting terminal, and a water-immersed seal 9 bonded onto a test terminal 30 which will be described later, in an asymmetrical arrangement. FIG. 9 is an exploded view of this battery pack 1 showing its major constituents. These and their assembling steps will be described below in detail.

A rechargeable battery 2 of the battery pack 1 is the same as the plain battery 101 shown in FIGS. 2A and 2B of the battery according to the first embodiment, and so its description will be omitted.

Figure 10A:
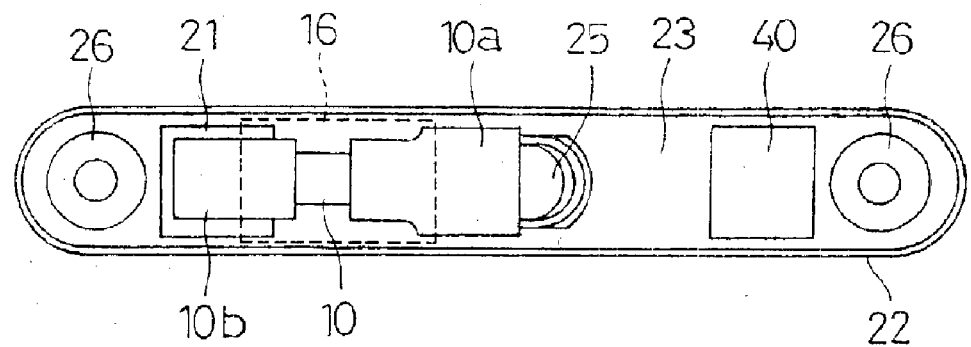
FIG. 10A is a top plan view and FIG. 10B is a cross-sectional view, both showing a rechargeable battery equipped with a thermal fuse.
Figure 10B:
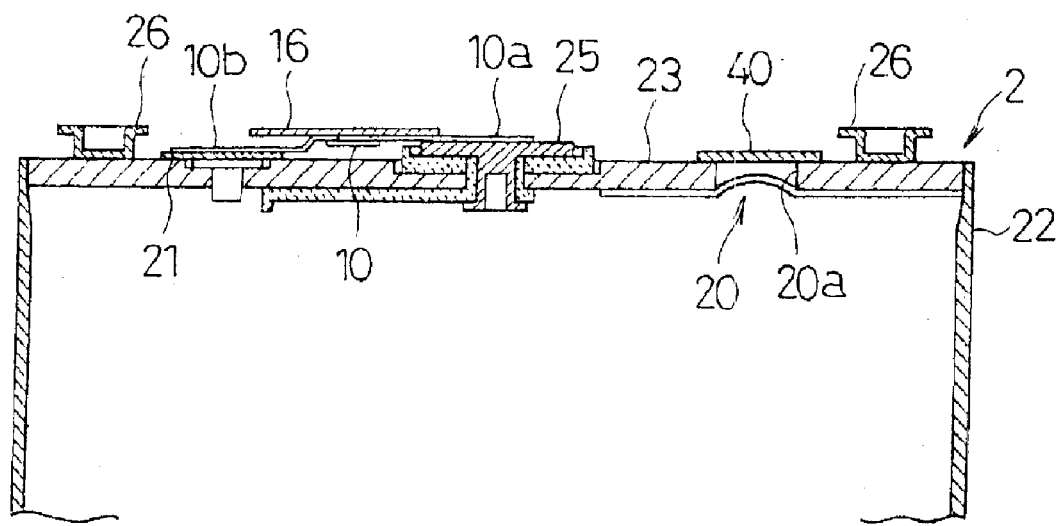

As shown in FIGS. 10A and 10B, a first connector piece 10a of the thermal fuse 10 is welded to the rivet 25. A heat insulation sheet 16 is bonded as indicated by a broken line onto the thermal fuse 10 so as to prevent the thermal fuse 10 from melting during a resin filling step described later. A second connector piece 10b of the thermal fuse 10 is positioned upon the insulation sheet 21 affixed onto the sealing plate 23 and bonded to one end of a negative lead plate 5 described later by spot welding. The thermal fuse 10 is bonded to the sealing plate 23 with a heat conductive adhesive so as to be heat-coupled with the rechargeable battery 2. The thermal fuse 10 used in this embodiment may be substituted by a PTC element 110 employed in the batteries 100a, 100b of the previous embodiment.

Figure 11A:
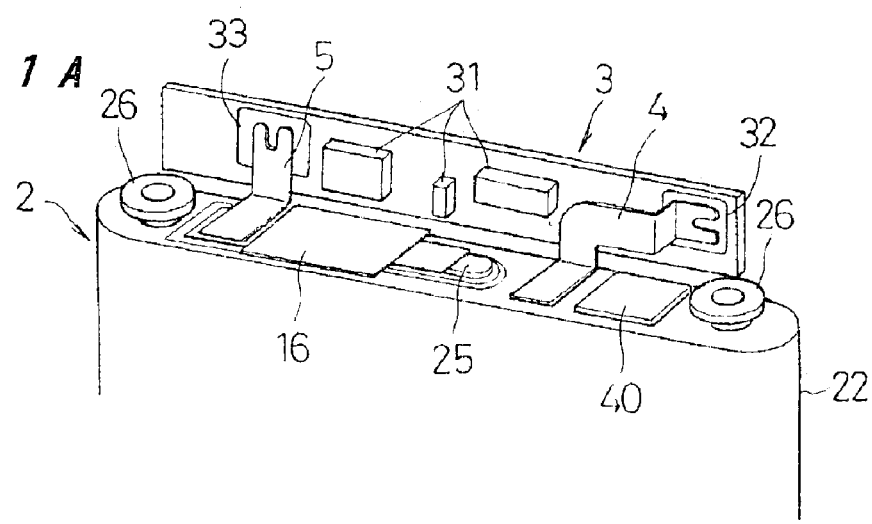
FIGS. 11A and 11B are perspective views showing the state of a rechargeable battery equipped with a circuit substrate.

A circuit substrate 3 shown in FIG. 11A carries a circuit for protecting the rechargeable battery 2 from overcharge, overdischarge, and overcurrent. It is formed with the external terminals 6 and test terminal 30 mentioned above on one side thereof which will be its outer face. On the other side (on the side of the rechargeable battery 2) of the circuit substrate 3 are mounted various electronic components 31 such as integrated circuits, and at either end of this side are formed a positive electrode solder land 32 and a negative electrode solder land 33 for establishing electrical connection with the rechargeable battery 2. To the positive electrode solder land 32 is soldered one end of a positive lead plate (connection member) 4, and to the negative electrode solder land 33 is soldered one end of a negative lead plate (connection member) 5. In the drawings, illustration of circuit patterns and through holes formed on the circuit substrate 3 is omitted.

Figure 11B:
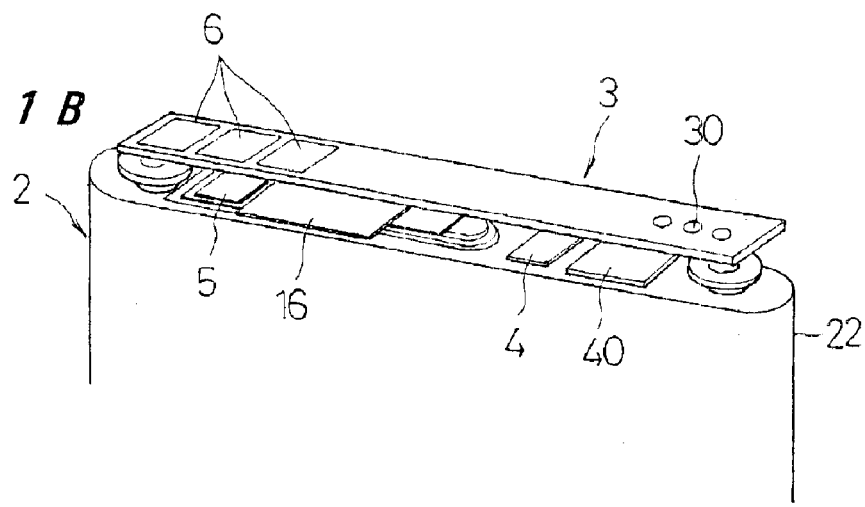
Figure 12A:
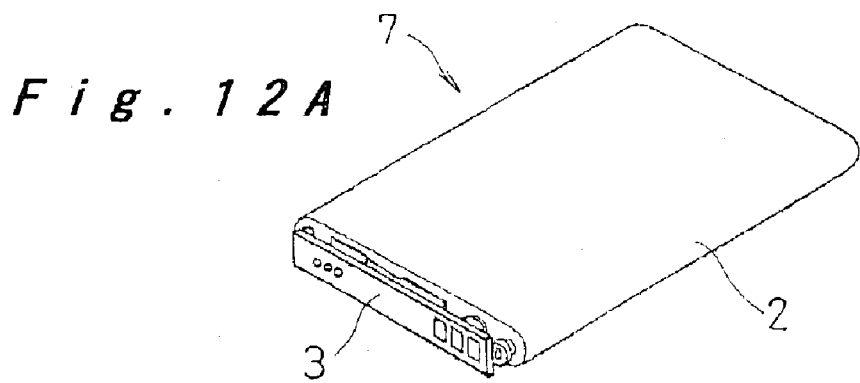
FIGS. 12A to 12C are perspective views showing various steps of producing the battery pack.

When all the necessary connections are made, the circuit substrate 3 is mounted to the rechargeable battery 2, by spot-welding the other end of the positive lead plate 4 to the plate surface of the sealing plate 23, and the other end of the negative lead plate 5 onto the second connector piece 10b of the thermal fuse 10. In this state, the circuit substrate 3 is orthogonal to the plate surface of the sealing plate 23. The positive and negative lead plates 4, 5 are then folded as shown in FIG. 11B, so that the circuit substrate 3 is substantially parallel to the sealing plate 23, with a certain clearance between the two plate surfaces. The circuit substrate 3 is thus connected to the rechargeable battery 2 and so an object 7 to be resin-packed shown in FIG. 12A is obtained.

Figure 13:
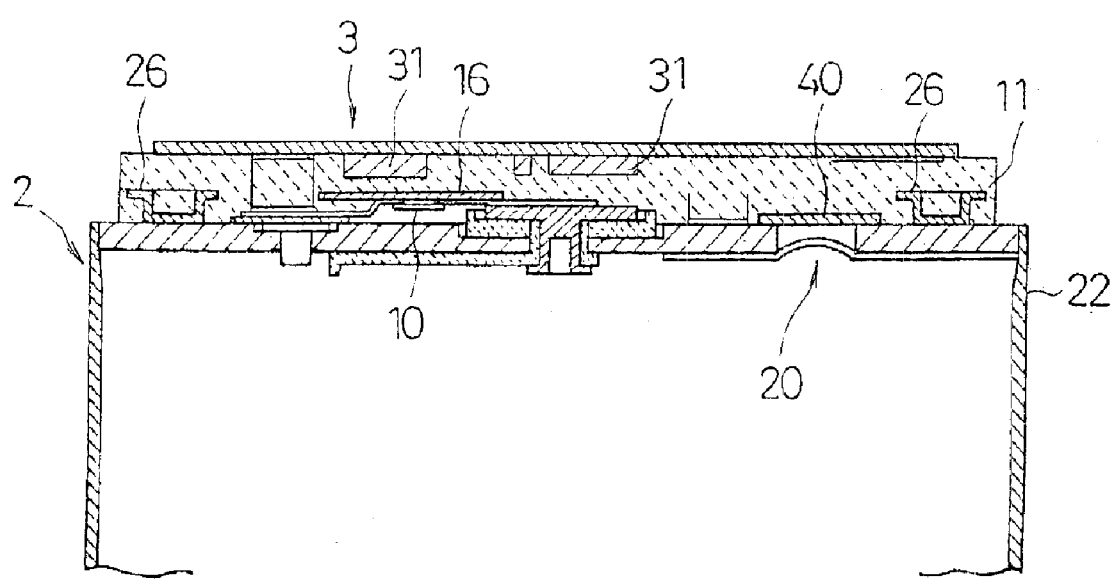
FIG. 13 is a cross-sectional view of a rechargeable battery and a circuit substrate united by means of a resin mold package.

The object 7 to be resin-packed then undergoes a resin filling step, in which resin is filled in the gap between the rechargeable battery 2 and the circuit substrate 3 to form a primary mold piece (first frame) 11 which integrates the rechargeable battery 2 and circuit substrate 3. The object 7 is accommodated inside a molding die for primary molding and resin is filled in the gap between the rechargeable battery 2 and the circuit substrate 3 as shown in FIG. 13.

Figure 14:
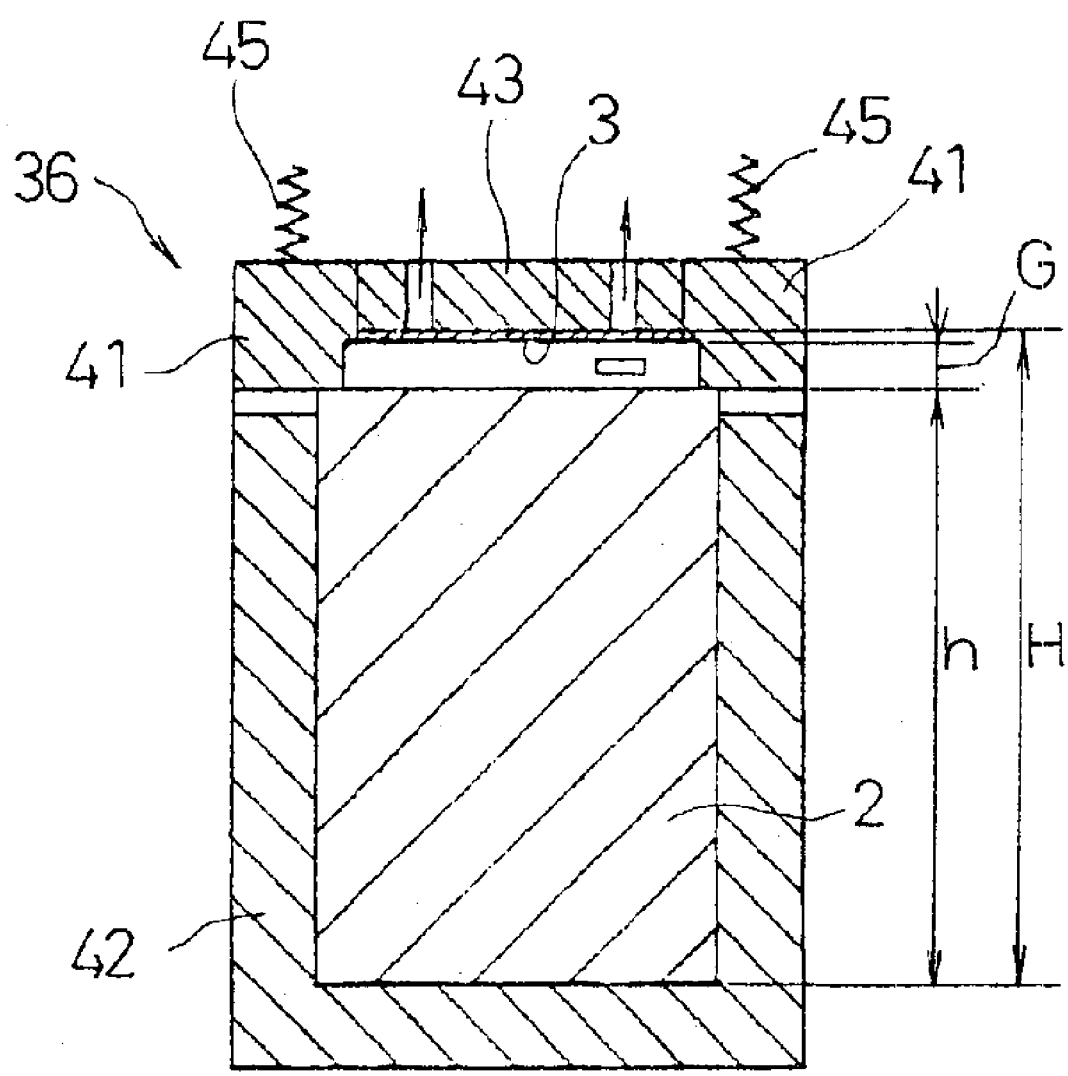
FIG. 14 is a model view showing the configuration of a molding die for primary molding.

As shown in FIG. 14, the molding die for primary molding includes a lower die 36 having a stationary part 42 and a movable part 41 which is driven towards the stationary part 42 by biasing means 45. The movable part 41 incorporates a vacuum suction system 43 therein. The object 7 to be resin-packed is placed inside the lower die 36 with its movable part 41 retracted. The movable part 41 then advances and pushes the rechargeable battery 2 to its predetermined position where its bottom touches the inner wall of the stationary part 42. Meanwhile, the circuit substrate 3 is tightly held in position by vacuum suction from the vacuum suction system 43.

Since there are variations in the height h of the rechargeable battery 2 itself, if the circuit substrate 3 is not held in position, there will be variations in the overall height H from the bottom of the rechargeable battery 2 to the top face of the circuit substrate 3 where the external terminals are formed. According to the invention, however, the circuit substrate 3 is fixed in position by vacuum suction, and the movable part 41 can move in accordance with the height h of the rechargeable battery 2. In other words, the gap G between the rechargeable battery 2 and circuit substrate 3 positioned inside the lower die 36 accommodates the variations in the overall height H from the bottom of the rechargeable battery 2 to the top face of the circuit substrate 3, and the height H is thus made constant.

The lower die 36, with the rechargeable battery 2 and circuit substrate 3 positioned therein, is then closed by an upper die, and resin is injected into the gap between the rechargeable battery 2 and the circuit substrate 3. The injected resin surrounds, as shown in FIG. 13, the electronic components 31 and positive and negative lead plates 4, 5 mounted on the circuit substrate, thereby bonding thereto, and also surrounds the undercuts of the engaging projections 26 formed on the sealing plate 23 of the rechargeable battery 2, thereby bonding thereto. For the filling resin, thermoplastic polyamide resin is suitable, as it melts at such a low temperature as not to cause adverse effects to the electronic components 31, rechargeable battery 2, or thermal fuse 10, and cures as the temperature lowers. For example, the Thermelt 817 available from TRL which is a thermoplastic polyamide type resin may be suitably used. Thermelt 817 can be used for molding at a temperature from 190 to 210° C. and cures quickly, i.e., in 5 seconds, and so does not cause any adverse thermal effects to batteries or electronic components.

While the resin is of the kind that melts at a relatively low temperature, the resin temperature can go up over 200° C., and if the thermal fuse 10 has a fusing temperature of, for example, 104° C., the heat may cause blowout of the thermal fuse 10, terminating the functioning of the battery pack 1. To prevent this, the heat insulation sheet 16 is affixed over the thermal fuse 10 to shut out heat from the melting resin.

Figure 12B:
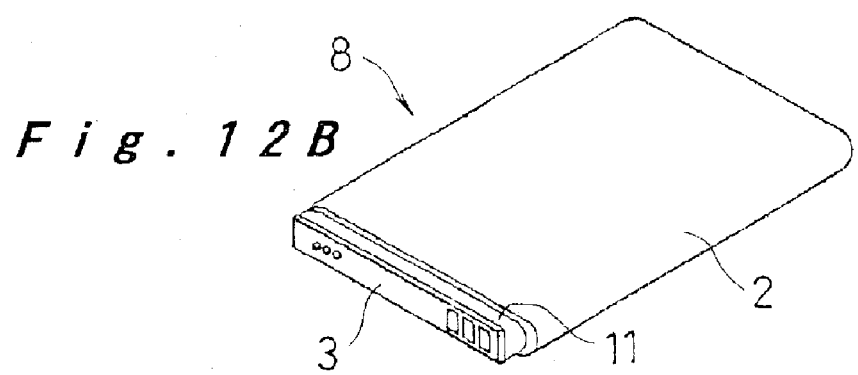

When the filled resin is set, an intermediate product 8 shown in FIG. 12B is removed from the lower die 36. The intermediate product 8 is then provided with an outer cover to be finished as the battery pack 1. The outer cover in this example is provided by secondary molding and the attaching of a wrapping sheet. Before performing the secondary molding, an insulator 14 is bonded to the bottom of the rechargeable battery 2.

Figure 15:
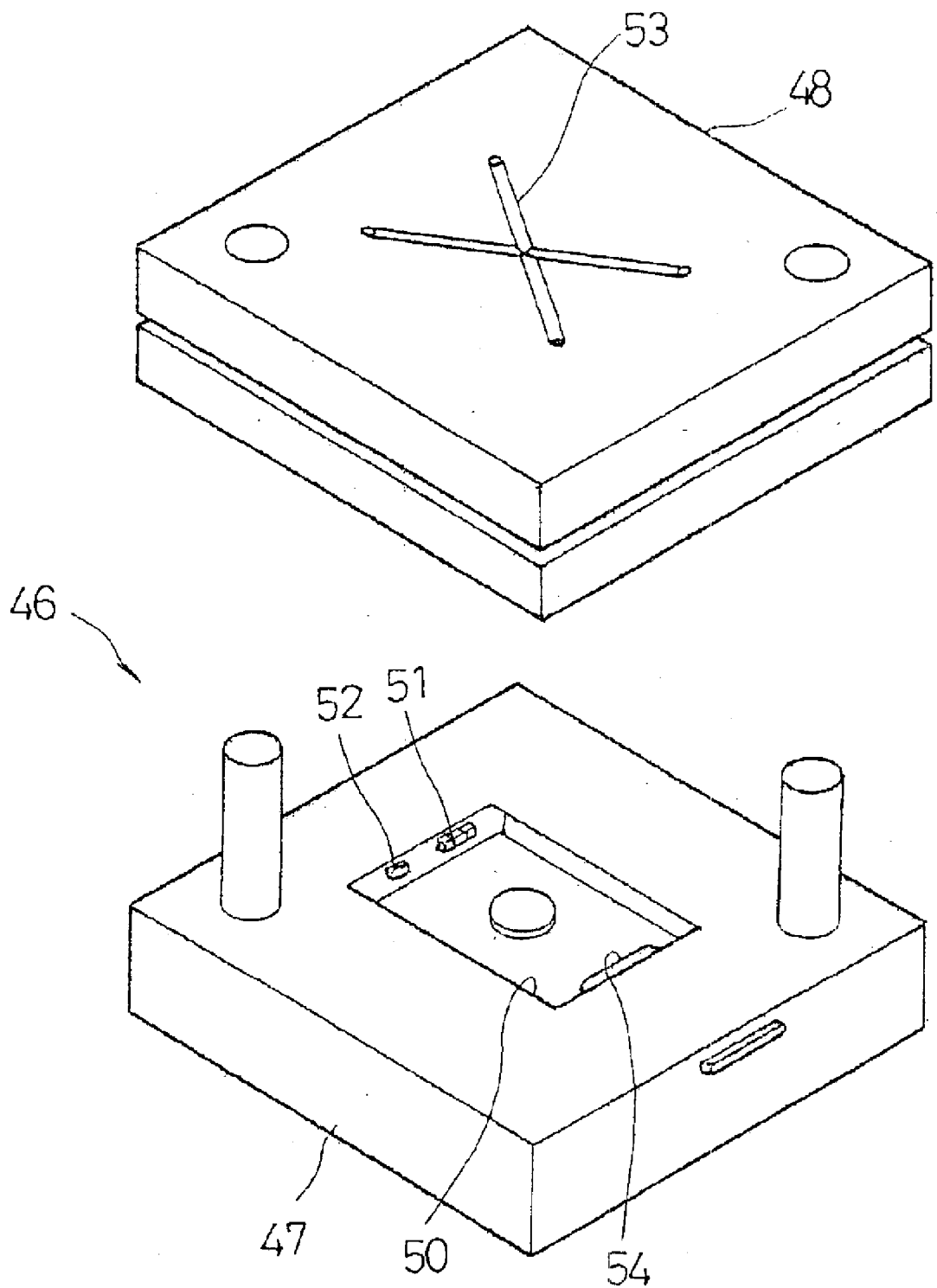
FIG. 15 is a perspective view showing the configuration of a molding die for secondary molding.

Secondary molding is carried out with a molding die 46 therefor shown in FIG. 15. The intermediate product 8 is placed in the molding die 46 and resin is filled in a necessary portion of the intermediate product 8. The molding die 46 for secondary molding consists of a lower die 47 having a cavity 50 to accommodate the intermediate product 8, and in one side wall of the cavity 50 are provided inwardly biased three projections 51 for the external terminals and one projection 52 for the test terminal, and in the opposite side wall is provided an inwardly biased projection 54 for the bottom of the battery. When the intermediate product 8 is placed inside the cavity 50, these inwardly biased projections 51, 52, and 54 all come into pressure contact with the three external terminals 6 on the circuit substrate 3, test terminal 30, and the insulator 14 bonded on the bottom of the rechargeable battery 2, respectively.

Figure 16:
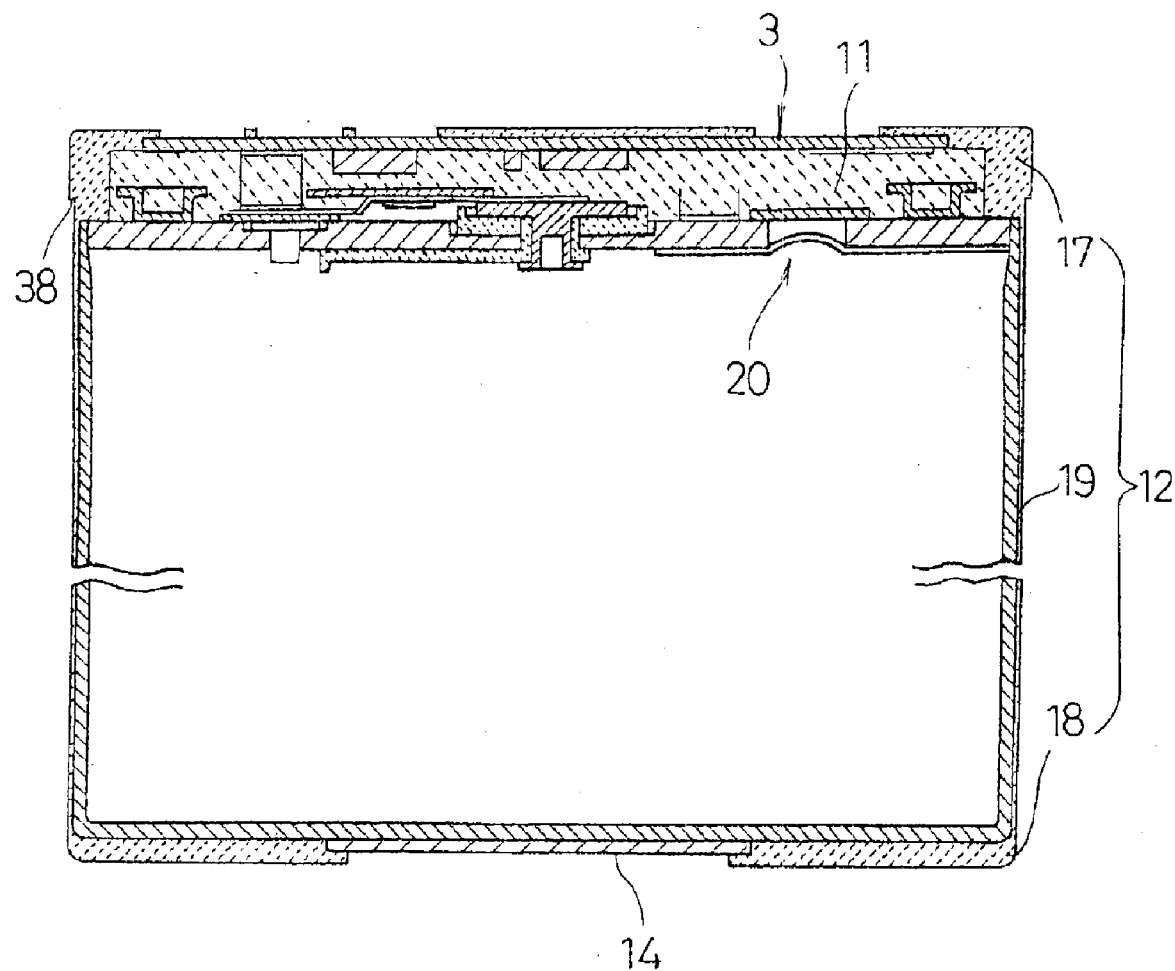
FIG. 16 is a cross-sectional view showing the battery formed with a secondary mold piece.

The lower die 47 is then closed by an upper die 48, and resin is injected from a gate 53 in the upper die 48 into the die 46 for secondary molding. Resin is injected from four points into the molding die 46 so as to form an upper mold piece 17, a lower mold piece 18, and a coupling mold piece 19 as shown in FIG. 16. The upper mold piece 17 covers the primary mold piece 11 and the circuit substrate 3, while exposing the external terminals 6, the test terminal 30, and a central portion of the insulator 14 of the intermediate product 8. The upper mold piece 17 is fixed on the sealing plate 23 of the rechargeable battery 2. The lower mold piece 18 is fixed on the bottom of the rechargeable battery 2 covering the periphery of the insulator 14 to a predetermined thickness. The coupling mold piece 19 links the upper mold piece 17 and the lower mold piece 18 via side corners of the rechargeable battery.

The resin used for the secondary molding may be the same as that of the primary molding, or it may be of a different kind. If the same resin is used for both molding, the resin mold pieces will form very strong bonds which accordingly have high mechanical strength. Alternatively, different resins may be selected according to the requirements or characteristics desired for each molding process. For example, the primary molding is performed chiefly for providing insulation coating of the circuit substrate 3 and for integrating it to the rechargeable battery 2. Therefore, taking account of thermal effects to the circuit substrate 3 and thermal fuse 10, a resin having a low melting temperature and exhibiting high insulation and high adhesion to metal should be selected. On the other hand, the secondary mold piece contributes to the appearance of the battery pack, and therefore it is desired to have both high mechanical strength and excellent surface properties. The resin for the secondary molding may be of a type that melts at a high temperature, e.g., an ABS resin material, since the molten resin does not directly contact delicate constituents such as electronic components 31 on the circuit substrate 3 and thermal fuse 10 during the secondary molding.

If different resins are to be used for the primary and secondary molding, it is necessary to take account of adhesion between the resins, mechanical strength, and chemical stability of the two different materials. Further, the color tone of the resin for the secondary molding should be the same level as, or darker than, that of the primary molding. This is because, if a bright color is adopted for the secondary molding, the color of the primary molding resin may show through the secondary molding resin and damage the appearance of the battery pack. For the same reason, the resin for the secondary molding should have the same or a darker color with respect to the circuit substrate 3 and the resist coated thereon.

Figure 12C:
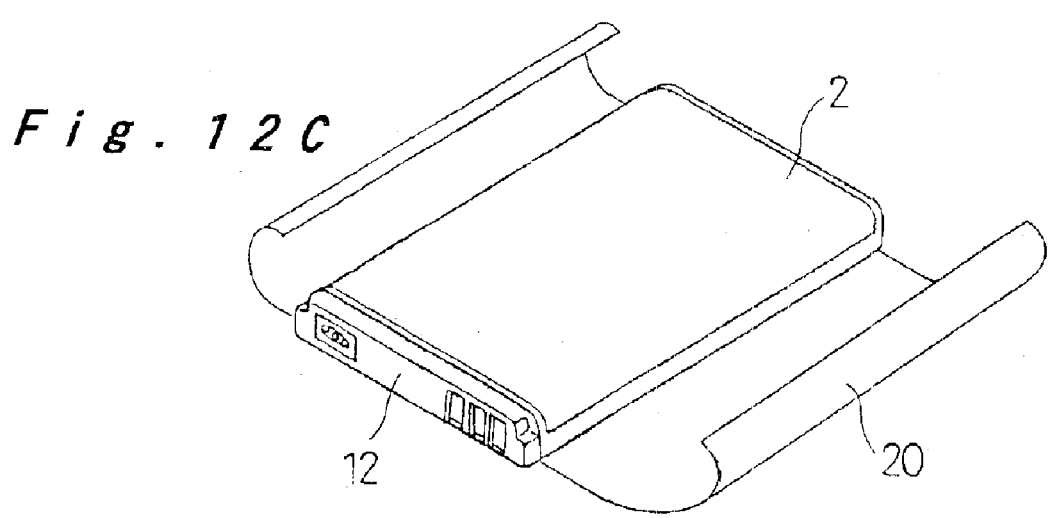
Figure 17:
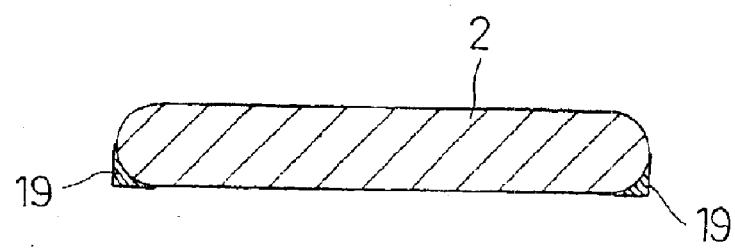
FIG. 17 is a cross-sectional view showing the location where a coupling mold piece is formed.

The coupling mold piece 19 is formed on one side face of the rechargeable battery 2, as shown in FIG. 17, having an ellipse cross section such that the curved corners on one side covering 90 degrees of arc are right-angled. The secondary mold piece (second frame) 12 is thus formed, including the upper mold piece 17, lower mold piece 18, and coupling mold piece 19, as shown in FIG. 12C.

In the peripheral side face of the upper mold piece 17 is formed a step 38 on the side of the rechargeable battery, which will function as a locator for determining an edge line when wrapping the wrapping sheet 20 around the periphery of the rechargeable battery 2. Battery operation is then inspected using the test terminal 30. For the batteries that have passed the inspection, a water-immersed seal 9 is attached inside a cavity around the test terminal 30, and thus the battery pack 1 shown in FIG. 8 is complete.

The flat battery pack 1 has rounded corners on one side face, conforming to the curved corners at both ends of the rechargeable battery 2, while it has right-angled corners on the other side face because of the coupling mold piece 19. This structure, combined with the asymmetrical arrangement of the external terminals 6, helps prevent reverse insertion of the battery pack into a device. Also, the rounded corners will conform to round-cornered space in the case inside the device, so that the battery pack can neatly fit into the device.

Alternatively, the secondary mold piece 12 may only be provided as the upper mold piece 17 upon the circuit substrate 3 and the primary mold piece 11. In that case, an insulator 14a or a mold piece of ABS resin, ABS+PC resin, or PC resin formed in the same shape as the lower mold piece 18 is bonded to the bottom of the rechargeable battery 2. The coupling mold piece 19 is not provided, and the peripheral side face of the rechargeable battery 2, together with the upper mold piece 17 and end portions of the insulator 14, is covered by the wrapping sheet 13. Since such secondary mold piece 12 is formed only to a part of the battery, the molding die for second molding need not accommodate the entire battery. Therefore, the molding die can be designed such as to accommodate only part of the battery where a desired mold piece is molded. Thus, since the entire rechargeable battery 2 need not be placed within the molding die, thermal effects to the battery are minimized. Since the molding die is made smaller, a reduction in production cost is also achieved.

Another option is to form a resin mold piece of the same shape as the upper mold piece 17, attach it onto the circuit substrate 3 to cover the primary mold piece 11, while bonding the insulator 14a mentioned above to the bottom of the rechargeable battery 2, and to wrap the peripheral side face of the rechargeable battery 2 and end portions of these upper and lower mold pieces with the wrapping sheet 13.

The following is a description of a battery pack according to a third embodiment of the invention. The battery pack of this embodiment contains a plurality of rechargeable batteries.

Figure 18:
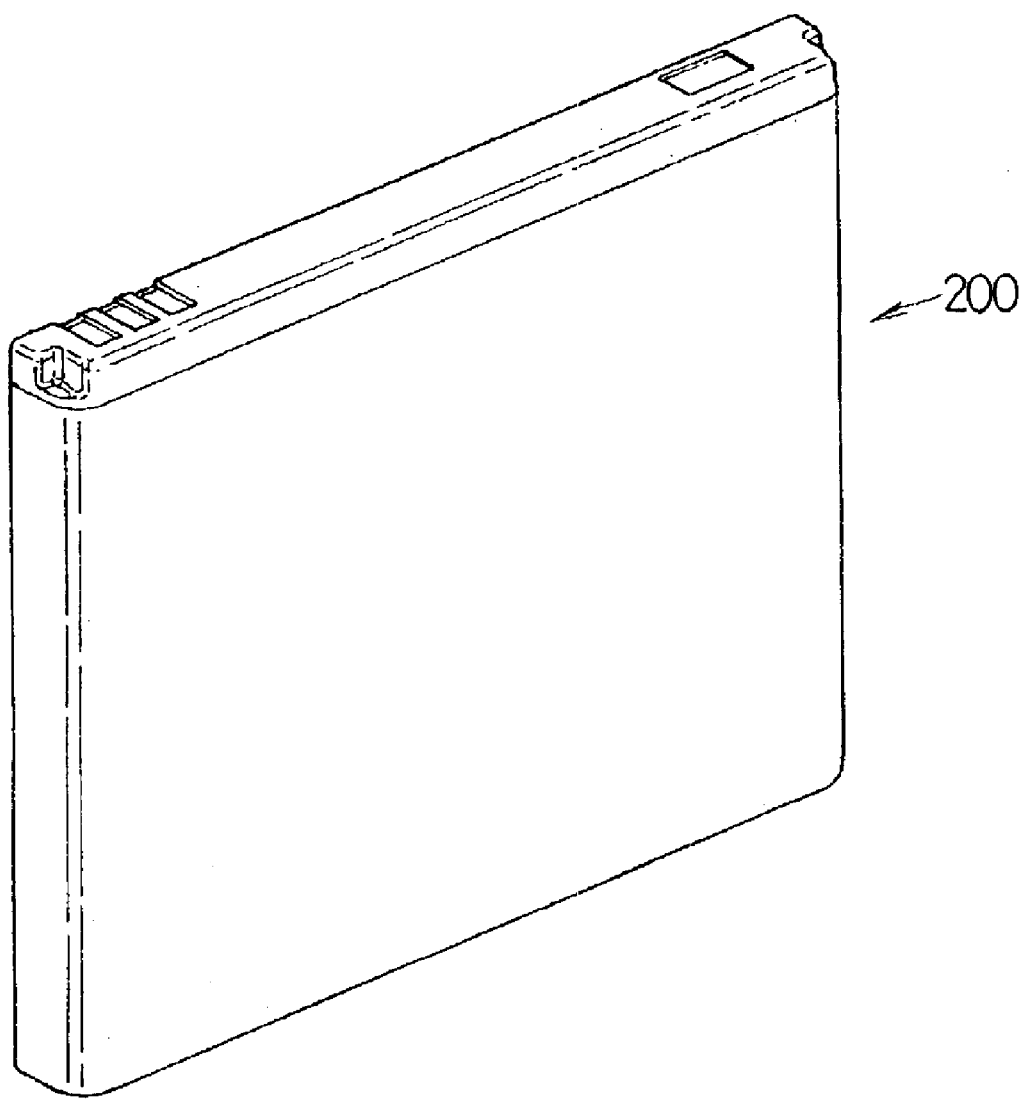
FIG. 18 is a perspective view showing the outer appearance of a battery pack with a plurality of rechargeable batteries.

FIG. 18 is an outer representation of the battery pack 200 according to the third embodiment. It contains two flat prismatic rechargeable batteries 2a, 2b connected in series to a circuit substrate 203 integrated therewith by a resin mold package 202 as shown in FIG. 19.

The rechargeable batteries 2a, 2b are constructed basically the same as the rechargeable battery 2 described above, except that additional engaging members 26, 26 are bonded to the bottom of the battery case 22 so as to ensure the bond between two rechargeable batteries 2a, 2b. The positive electrode connecting land on the circuit substrate 203 is electrically connected to the bottom of the battery case 22 of rechargeable battery 2b by a positive lead plate 204. The negative electrode connecting land on the circuit substrate 203 is electrically connected to the other connector piece 10b of the thermal fuse 10 on rechargeable battery 2a by a negative lead plate 205. The sealing plate 23 of the rechargeable battery 2a is electrically connected to the rivet 25 of the rechargeable battery 2b by a series-connection lead plate 207.

Figure 19:
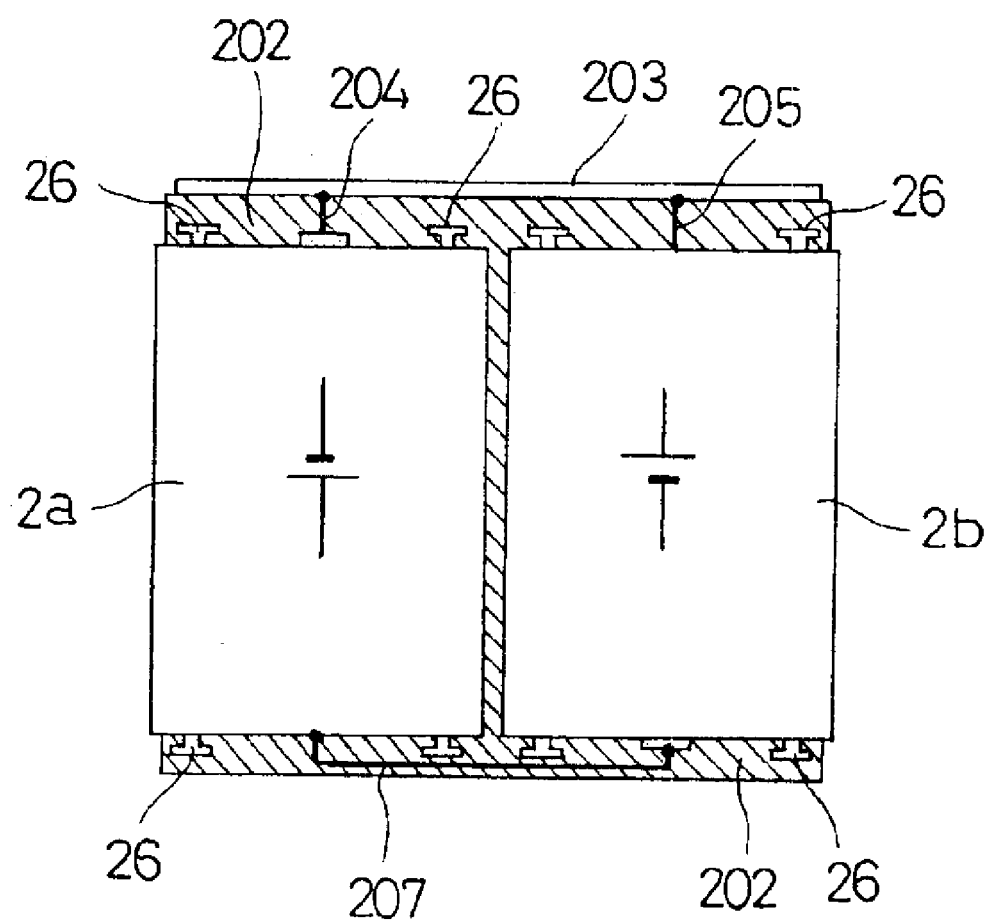
FIG. 19 is a model view showing the one-piece structure of the battery pack.

The two rechargeable batteries 2a, 2b connected in series are placed inside a molding die together with the circuit substrate 203, in opposite orientation side by side with a clearance therebetween, as shown in FIG. 19, for performing primary molding. Resin is filled between the two batteries 2a, 2b and in the gaps on top and bottom of the batteries to form a resin mold package 202, whereby the two batteries 2a, 2b and circuit substrate 203 are integrated. The engaging members 26 provided on the top and bottom of the batteries 2a, 2b serve as anchors to the resin mold package 202, whereby the batteries 2a, 2b are firmly united to the resin mold package 202. Two rechargeable batteries 2a, 2b and circuit substrate 203 connected together in a rather fragile state only with connecting lead plates 204, 205, and 207 are thus united as a rigid one-piece pack.

The two batteries shown in FIG. 19 will function as a battery pack, but in order to further improve the strength and the outer appearance, an outer cover may be provided, so that the finished battery pack 200 will appear as shown in FIG. 18. The outer cover may consist of a secondary mold piece and a wrapping sheet similarly to the battery pack 1 of the second embodiment. On the sealing plate 23 of the battery 2a is mounted a thermal fuse 10 connected to the rivet 25, and a resin sheet 40 is attached upon the safety vent 20, as was shown in FIGS. 10A and 10B.

Figure 20:
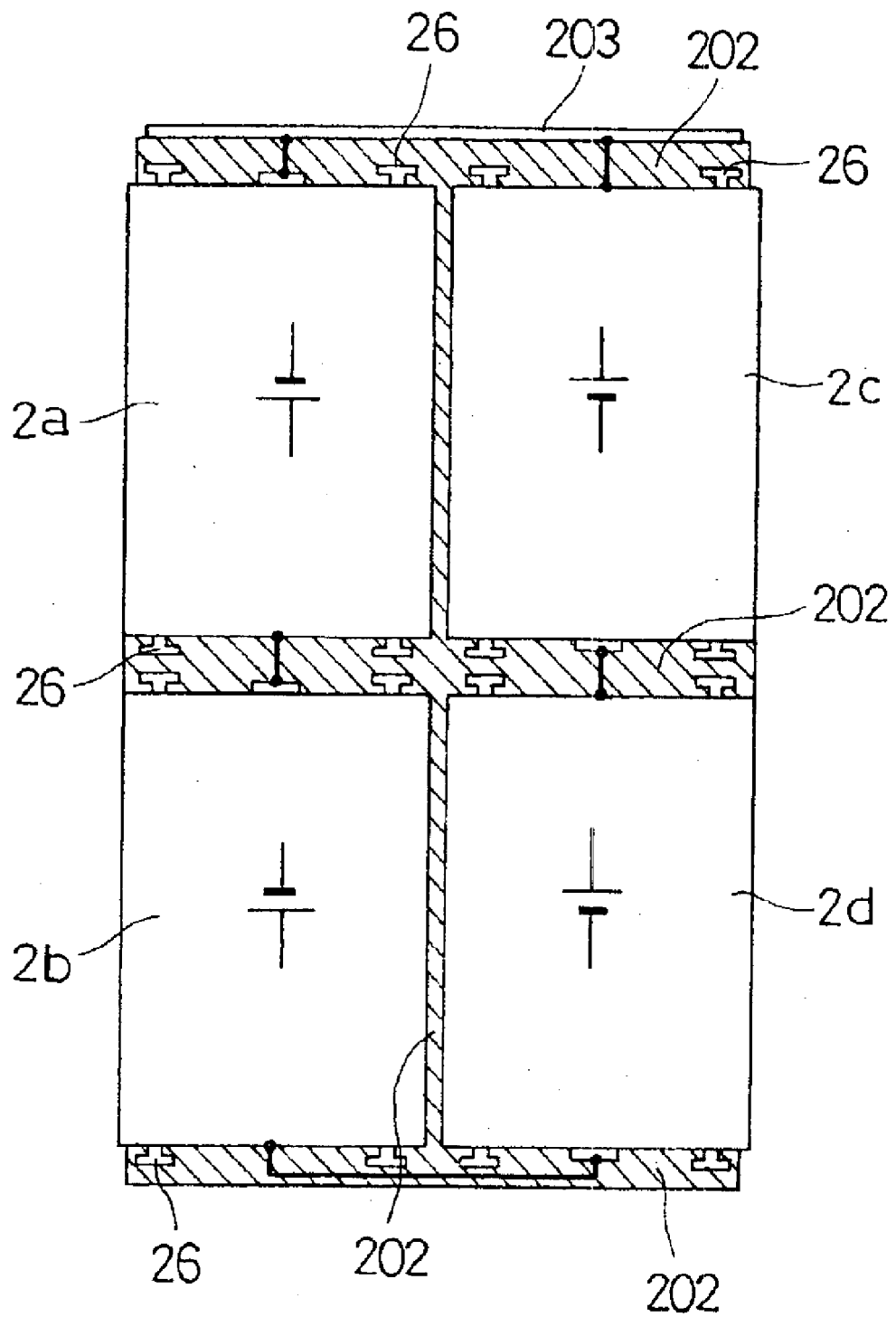
FIG. 20 is a model view showing the one-piece structure of a battery pack with a plurality of rechargeable batteries.

Apart from the above-described third embodiment in which two rechargeable batteries 2a, 2b are connected in series, any number of rechargeable batteries may be used depending on needs, connected either in series and/or in parallel, to form a battery pack. For example, a battery pack of four rechargeable batteries 2a to 2d connected in series may be constructed, as shown in FIG. 20. In this case also, additional engaging members 26 may be provided to the sealing plate 23 and to the bottom of the battery case 22 of the batteries 2a to 2d for gripping the filled resin, so as to firmly integrate the batteries 2a to 2d with the circuit substrate 203.

INDUSTRIAL APPLICABILITY

As described above, the battery according to the present invention includes a plain battery united with a substrate formed at least with external terminals. The positive and negative electrodes of the battery are therefore formed on the same plane of the substrate. Thereby, the battery contributes to simplification of the battery connection structure on the side of electric devices. Also, thermo-sensitive elements such as thermal fuses, PTC elements, and thermistors can be built in between the plain battery and the substrate, or on the substrate, whereby the battery is readily designed to have battery protection features and safety features, or charge control features based on temperature detection.

The battery pack according to the present invention makes possible to integrate a rechargeable battery with a circuit substrate and the like without using a resin pack case. It can therefore be designed to be small and thin, and, because of its rigid resin mold structure, it is suitably applied for portable electronic devices which tend to be subjected to vibration or impact. Furthermore, since it does not necessitate a resin mold case, a considerable reduction is achieved both in time and in cost of producing molding dies for the resin molding. Therefore it is suitably adapted to multi-kind and small-scale production.

What is claimed is:

1. A battery comprising a single battery or a battery consisting of a plurality of cells connected to one another, a circuit substrate including a protection circuit element for the battery and external terminals, and a resin mold package interposed between the circuit substrate and said battery for uniting said battery and said circuit substrate, the protection circuit element being mounted on one side of the circuit substrate opposite one end face of said battery where one of terminals of the battery is disposed, the external terminals being provided on the opposite side from the protection circuit element of the circuit substrate, and said resin mold package covering and providing electrical insulation between said one end face of the battery and said one side of the circuit substrate where the protection circuit element is mounted.

2. A battery comprising a plain battery, a substrate on which at least external terminals are formed, a connection member for electrically connecting the substrate and said plain battery, a resin mold package formed by filling resin such as to bond predetermined faces of the plain battery and the substrate so as to integrate the two, and engaging means for engaging the resin mold package with the plain battery and/or the substrate, wherein the engaging means is formed in the shape of an undercut protrusion having an anchoring function with respect to the resin mold package, and provided on a portion of the plain battery and/or the substrate where the resin mold package is bonded.

3. A battery comprising a plain battery, a substrate on which at least external terminals are formed, a connection member for electrically connecting the substrate and said plain battery, a resin mold package formed by filling resin such as to bond predetermined faces of the plain battery and the substrate so as to integrate the two, engaging means for engaging the resin mold package with the plain battery and/or the substrate, and an outer cover for covering the outer face of the plain battery with the substrate, wherein at least the external terminals are exposed to the outside, wherein the engaging means is formed in the shape of an undercut protrusion having an anchoring function with respect to the resin mold package, and provided on a portion of the plain battery and/or the substrate where the resin mold package is bonded.

4. The battery according to claim 2, wherein the engaging means is a resin bond material capable of forming a bond with the resin mold package and with metal, and provided on a portion of the plain battery and/or the substrate where the resin mold package is bonded.

5. The battery according to claim 2, wherein the connection member is a thermo-sensitive element having a lead, and the lead connects the plain battery to the substrate.

6. The battery according to claim 3, wherein the outer cover includes an upper resin mold piece covering at least part of the substrate and the resin mold package while exposing the external terminals to the outside, a lower resin mold piece covering the opposite side face from the substrate of the plain battery, and a wrapping sheet for wrapping part of the upper resin mold piece and the lower resin mold piece and a body part of the plain battery.

7. The battery according to claim 6, further including a coupling resin mold piece connecting the upper resin mold piece and the lower resin mold piece.

8. A battery pack comprising a single battery or a battery consisting of a plurality of cells connected to one another, a circuit substrate including a protection circuit element for the battety and external terminals, a first frame supporting the circuit substrate and one end face of the battery and having an aperture for exposing the external terminals, a second frame holding the other end face of the battery, and a pair of coupling members connecting said first and second frames along shorter side edges of said battery.

9. The battery pack according to claim 8, further comprising a sheet covering an exposed surface of the battery and forming part of an outer cover member integrally with the first and second frames.

10. The battery pack according to claim 8, further comprising a resin mold package uniting the battery and the circuit substrate and covering the surface of the circuit substrate where the protection circuit element is mounted for providing electrical insulation, the first frame being formed such as to surround said resin mold package, and said first frame, second frame, and pair of coupling members being integrally formed.

11. A battery pack comprising one or a plurality of batteries, a substrate formed with at least external terminals, a connection member for electrically connecting the substrate and said battery, a resin mold package formed by filling resin such as to bond predetermined faces of the battery and the substrate so as to integrate the two, and engaging means for engaging the resin mold package and the battery and/or the substrate, wherein the engaging means is formed in the shape of an undercut protrusion having an anchoring function with respect to the resin mold package, and provided on a portion of the battery and/or the substrate where the resin mold package is bonded.

12. A battery pack comprising one or a plurality of batteries, a substrate formed with at least external terminals, a connection member for electrically connecting the substrate and said battery, a resin mold package formed by filling resin such as to bond predetermined faces of the battery and the substrate so as to integrate the two, engaging means for engaging the resin mold package and the battery and/or the substrate, and an outer cover for covering the outer face of the battery with the substrate, wherein at least the external terminals are exposed to the outside, wherein the engaging means is formed in the shape of an undercut protrusion having an anchoring function with respect to the resin mold package, and provided on a portion of the battery and/or the substrate where the resin mold package is bonded.

13. The battery pack according to claim 11, wherein the engaging means is a resin bond material capable of forming a bond with the resin mold package and with metal, and provided on a portion of the battery and/or the substrate where the resin mold package is bonded.

14. The battery pack according to claim 11, wherein the connection member is a thermo-sensitive element having a lead, and the lead connects the battery to the substrate.

15. The battery pack according to claim 12, wherein the outer cover includes an upper resin mold piece covering at least part of the substrate and the resin mold package while exposing the external terminals to the outside, a lower resin mold piece covering the opposite side face from the substrate of the rechargeable battery, and a wrapping sheet for wrapping part of the upper resin mold piece and the lower resin mold piece and a body part of the rechargeable battery.

16. The battery pack according to claim 12, wherein the plurality of rechargeable batteries are arranged side by side and integrated by filling resin in a gap between the batteries.

17. The battery pack according to claim 12, further comprising a coupling resin mold piece connecting the upper resin mold piece and the lower resin mold piece.

\* \* \* \* \*